(12) United States Patent
Dai et al.

(10) Patent No.: US 12,332,446 B2
(45) Date of Patent: Jun. 17, 2025

(54) DISPLAY DEVICE MODULE AND HEAD-MOUNTED DISPLAY DEVICE

(71) Applicant: HUAWEI TECHNOLOGIES CO., LTD., Shenzhen (CN)

(72) Inventors: Jie Dai, Dongguan (CN); Jiandong Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 513 days.

(21) Appl. No.: 17/716,247

(22) Filed: Apr. 8, 2022

(65) Prior Publication Data

US 2022/0229303 A1  Jul. 21, 2022

Related U.S. Application Data

(63) Continuation of application No. PCT/CN2020/119721, filed on Sep. 30, 2020.

(30) Foreign Application Priority Data

Oct. 10, 2019  (CN) .......................... 201910960169.4
Oct. 10, 2019  (CN) .......................... 201910960170.7

(51) Int. Cl.
    *G02B 27/01*    (2006.01)
    *G02B 27/28*    (2006.01)
(52) U.S. Cl.
    CPC ....... *G02B 27/0172* (2013.01); *G02B 27/285* (2013.01); *G02B 2027/0178* (2013.01)
(58) Field of Classification Search
    CPC .. G02B 27/01; G02B 27/017; G02B 27/0101;
    G02B 27/0172; G02B 27/0178; G02B 27/283; G02B 27/285; G02B 27/286; G02B 2027/0178; G02B 2027/0185; G02B 2027/0189

See application file for complete search history.

(56) References Cited

U.S. PATENT DOCUMENTS

| 5,959,780 A | 9/1999 | Togino et al. |
| 6,310,736 B1 | 10/2001 | Togino |
| 10,191,279 B2 | 1/2019 | Nortrup et al. |
| 2002/0015116 A1 | 2/2002 | Park |
| 2004/0032666 A1 | 2/2004 | Baba |

(Continued)

FOREIGN PATENT DOCUMENTS

| CN | 1313958 A | 9/2001 |
| CN | 101359089 B | 8/2010 |

(Continued)

*Primary Examiner* — Sultan Chowdhury
(74) *Attorney, Agent, or Firm* — Rimon PC

(57) ABSTRACT

Embodiments of this application provide a display device module, including a display panel, a non-coaxial optical component, a first optical element, and a second optical element. The non-coaxial optical component includes an incident surface and an emergent surface, and the incident surface of the non-coaxial optical component faces the display panel, so that light emitted by the display panel is capable of being transmitted through the incident surface and transmitted from the emergent surface. In this application, a thickness of a display module in a head-mounted display device in a viewing direction of human eyes is reduced, and a compact design of the head-mounted display device is implemented.

20 Claims, 19 Drawing Sheets

(56) References Cited

U.S. PATENT DOCUMENTS

| | | | |
|---|---|---|---|
| 2005/0254107 A1 | 11/2005 | Amanai | |
| 2014/0375790 A1* | 12/2014 | Robbins | G02B 27/017 |
| | | | 348/78 |
| 2015/0323788 A1* | 11/2015 | Zou | G02B 27/30 |
| | | | 359/630 |
| 2016/0171769 A1 | 6/2016 | Haddick et al. | |
| 2019/0018247 A1* | 1/2019 | Gao | G02B 3/12 |
| 2019/0041642 A1 | 2/2019 | Haddick et al. | |
| 2019/0384061 A1* | 12/2019 | Arora | G02B 27/0172 |
| 2020/0310135 A1* | 10/2020 | Fattal | G02B 27/106 |

FOREIGN PATENT DOCUMENTS

| | | |
|---|---|---|
| CN | 101900872 A | 12/2010 |
| CN | 105572879 A | 5/2016 |
| CN | 107300777 A | 10/2017 |
| CN | 107589546 A | 1/2018 |
| CN | 107966811 A | 4/2018 |
| CN | 108957750 A | 12/2018 |
| CN | 109709676 A | 5/2019 |
| CN | 110376738 A | 10/2019 |

\* cited by examiner

DISPLAY DEVICE MODULE AND HEAD-MOUNTED DISPLAY DEVICE

CROSS-REFERENCE TO RELATED APPLICATIONS

This application is a continuation of International Application No. PCT/CN2020/119721, filed on Sep. 30, 2020, which claims priority to Chinese Patent Application No. 201910960169.4, filed on Oct. 10, 2019, and Chinese Patent Application No. 201910960170.7, filed on Oct. 10, 2019. All of the aforementioned patent applications are hereby incorporated by reference in their entireties.

TECHNICAL FIELD

This application relates to the optical field, and in particular, to a display device module and a head-mounted display device.

BACKGROUND

A head-mounted display device may enhance or expand, by using additional information generated by a computer, a real-world scene seen by a user. This greatly changes the way in which a human being interacts with the computer or the external world. The device uses a combination of a plurality of technologies in different research fields, and is can be quickly applied to fields such as entertainment, scientific research, simulation training, and telemedicine.

In a head-mounted display device based on an augmented reality (AR) technology and a mixed reality (MR) technology, a virtual image displayed on a display panel needs to be first processed by a display device module, and then superposed with a real image to be presented to the user. Because the head-mounted display device is worn on the head of the user, to reduce pressure on the head of the user, a compact design is further required for the head-mounted display device.

SUMMARY

Embodiments of this application provide a head-mounted display device, so that a thickness of a display device module in the head-mounted display device in a viewing direction of human eyes is reduced, and a compact design of the head-mounted display device is implemented.

According to a first aspect, this application provides a display device module, including a display panel, a non-coaxial optical component, a first optical element, and a second optical element, where the non-coaxial optical component includes an incident surface and an emergent surface, and the incident surface of the non-coaxial optical component faces the display panel, so that light emitted by the display panel is capable of being transmitted through the incident surface and transmitted from the emergent surface;
the first optical element is configured to reflect, to the second optical element, the light transmitted from the emergent surface, where an included angle is provided between the first optical element and the second optical element; and
the second optical element is configured to reflect, back to the first optical element, the light reflected by the first optical element, so that the light is transmitted from the first optical element.
The display device module may further include a fastening system. The fastening system is configured to fasten the display panel, the non-coaxial optical component, the first optical element, and the second optical element. The second optical element is configured to reflect, back to the first optical element, the light reflected by the first optical element, so that the light is transmitted from the first optical element to the human eyes. The second optical element is further configured to transmit ambient light.

Optionally, in an optional design of the first aspect, the non-coaxial optical component further includes at least one reflective surface; and
the at least one reflective surface is disposed between the incident surface and the emergent surface, so that the light transmitted through the incident surface is capable of being transmitted from the emergent surface through reflection by the at least one reflective surface.

Optionally, in an optional design of the first aspect, the first optical element and the second optical element are sheet-like optical structures.

Optionally, in an optional design of the first aspect, the first optical element and the second optical element are plate-like optical structures or optical structures with at least one bent side.

Optionally, in an optional design of the first aspect, an opening direction of the included angle formed between the first optical element and the second optical element faces the emergent surface of the non-coaxial optical component.

Optionally, in an optional design of the first aspect, the non-coaxial optical component is located on a same side of the first optical element as the second optical element.

Optionally, in an optional design of the first aspect, the incident surface of the non-coaxial optical component faces the display panel, so that all of the light emitted by the display panel is capable of being transmitted through the incident surface and transmitted from the emergent surface.

Optionally, in an optional design of the first aspect, the first optical element includes a first end and a second end, the first end is an end that is of the first optical element and that is close to the non-coaxial optical component, the second end is an end that is of the first optical element and that is away from the non-coaxial optical component, and a distance between the first end and the human eyes is less than a distance between the second end and the human eyes.

Optionally, in an optional design of the first aspect, the second optical element includes a third end and a fourth end, the third end is an end that is of the second optical element and that is close to the non-coaxial optical component, the fourth end is an end that is of the second optical element and that is away from the non-coaxial optical component, and a distance between the third end and the human eyes is greater than a distance between the fourth end and the human eyes.

Optionally, in an optional design of the first aspect, the display device module further includes a compensation prism.

The compensation prism is disposed between the display panel and the incident surface of the non-coaxial optical component; or
the compensation prism is disposed between the emergent surface of the non-coaxial optical component and the first optical element.

Optionally, in an optional design of the first aspect, materials of the compensation prism and the non-coaxial optical component are different, and dispersion coefficients of the compensation prism and the non-coaxial optical component are different.

Optionally, in an optional design of the first aspect, materials of the compensation prism and the non-coaxial optical component are different, and refractive indexes of the compensation prism and the non-coaxial optical component are different.

Optionally, in an optional design of the first aspect, a part of a reflective film is disposed on a surface that is of the first optical element and that faces the second optical element.

Optionally, in an optional design of the first aspect, a first polarization beam splitter is disposed on the surface that is of the first optical element and that faces the second optical element, and a first phase retarder is disposed on a surface that is of the first polarization beam splitter and that faces the second optical element.

Optionally, in an optional design of the first aspect, a second phase retarder is further disposed between the display panel and the first optical element.

Optionally, in an optional design of the first aspect, a second phase retarder is further disposed on a first reflective surface.

Optionally, in an optional design of the first aspect, a second phase retarder is further disposed on a second reflective surface.

Optionally, in an optional design of the first aspect, a second phase retarder is further disposed on the emergent surface.

Optionally, in an optional design of the first aspect, geometric shapes, relative positions, and materials of the incident surface, the at least one reflective surface, and the emergent surface meet a preset relationship, so that light that is emitted by the display panel and that is in a same field of view intersects outside the emergent surface to form a linear image.

Optionally, in an optional design of the first aspect, based on a focal power parameter of the second reflective surface, the light that is emitted by the display panel and that is in the same field of view converges and intersects in a first direction to form the linear image, where the first direction is perpendicular to a plane formed by a horizontal viewing direction and a direction in which a line between the two eyes is located when a head-mounted display device is worn.

Optionally, in an optional design of the first aspect, the first optical element is asymmetric in the first direction.

Optionally, in an optional design of the first aspect, the second optical element is asymmetric in the first direction.

Optionally, in an optional design of the first aspect, a part of a reflective film is disposed on at least one surface of the second optical element.

According to a second aspect, this application further provides a head-mounted display device, including a left-eye display and a right-eye display, where the left-eye display and the right-eye display include the display device module according to any one of the optional designs of the first aspect.

This embodiment of this application provides the head-mounted display device, including the display panel, the non-coaxial optical component, the first optical element, and the second optical element. The non-coaxial optical component includes the incident surface and the emergent surface, and the incident surface of the non-coaxial optical component faces the display panel, so that light emitted by the display panel is capable of being transmitted through the incident surface and transmitted from the emergent surface. The first optical element is configured to reflect, to the second optical element, the light transmitted from the emergent surface, where an included angle is provided between the first optical element and the second optical element. The second optical element is configured to reflect, back to the first optical element, the light reflected by the first optical element, so that the light is transmitted from the first optical element to the human eyes. Compared with a manner in which physical glass or plastic is used for an optical structure in front of the eyes, requiring a compensation prism to be added to correct distorted imaging of an external scene, in this embodiment of this application, because an angle is provided between the first optical element and the second optical element, in other words, a gap is left between the first optical element and the second optical element, natural ambient light propagating to the human eyes is not refracted, imaging of the external scene is not distorted, and no additional compensation prism needs to be added. Therefore, a thickness of the display module in the head-mounted display device in a viewing direction of the human eyes is reduced, and a compact design of the head-mounted display device is implemented.

According to a third aspect, this application provides a display device module, including a display panel, a freeform prism, a first optical element, and a second optical element, where the freeform prism includes an incident surface, at least one reflective surface, and an emergent surface, and the incident surface of the freeform prism faces the display panel, so that light emitted by the display panel is capable of being transmitted through the incident surface and transmitted from the emergent surface through reflection by the at least one reflective surface;

the first optical element is configured to reflect, to the second optical element, the light transmitted from the emergent surface, where an included angle is provided between the first optical element and the second optical element; and the second optical element is configured to reflect, back to the first optical element, the light reflected by the first optical element, so that the light is transmitted from the first optical element.

Optionally, in an optional design of the third aspect, the first optical element and the second optical element are sheet-like optical structures.

Optionally, in an optional design of the third aspect, the first optical element and the second optical element are plate-like optical structures or optical structures with at least one bent side.

Optionally, an opening direction of the included angle formed between the first optical element and the second optical element faces the emergent surface of the freeform prism.

Optionally, in an optional design of the third aspect, the freeform prism is located on a same side of the first optical element as the second optical element.

Optionally, in an optional design of the third aspect, the display device module further includes a compensation prism; and the compensation prism is disposed between the display panel and the incident surface of the freeform prism; or
the compensation prism is disposed between the emergent surface of the freeform prism and the first optical element.

Optionally, in an optional design of the third aspect, materials of the compensation prism and the freeform prism are different, and dispersion coefficients of the compensation prism and the freeform prism are different.

Optionally, in an optional design of the third aspect, materials of the compensation prism and the freeform prism are different, and refractive indexes of the compensation prism and the freeform prism are different.

Optionally, in an optional design of the third aspect, a part of a reflective film is disposed on a surface that is of the first optical element and that faces the second optical element.

Optionally, in an optional design of the third aspect, a first polarization beam splitter is disposed on the surface that is of the first optical element and that faces the second optical element, and a first phase retarder is disposed on a surface that is of the first polarization beam splitter and that faces the second optical element.

Optionally, in an optional design of the third aspect, a second phase retarder is further disposed between the display panel and the first optical element.

Optionally, in an optional design of the third aspect, a second phase retarder is further disposed on the reflective surface.

Optionally, in an optional design of the third aspect, a second phase retarder is further disposed on the emergent surface.

Optionally, in an optional design of the third aspect, geometric shapes, relative positions, and materials of the incident surface, the at least one reflective surface, and the emergent surface meet a preset relationship, so that light that is emitted by the display panel and that is in a same field of view intersects outside the emergent surface to form a linear image.

Optionally, in an optional design of the third aspect, the light that is emitted by the display panel and that is in the same field of view converges and intersects in a first direction to form the linear image, where the first direction is perpendicular to a plane formed by a horizontal viewing direction and a direction in which a line between the two eyes is located when a head-mounted display device is worn.

Optionally, in an optional design of the third aspect, the first optical element is asymmetric in the first direction.

Optionally, in an optional design of the third aspect, the second optical element is asymmetric in the first direction.

Optionally, in an optional design of the third aspect, a part of a reflective film is disposed on at least one surface of the second optical element.

According to a fourth aspect, this application further provides a head-mounted display device, including a left-eye display and a right-eye display, where the left-eye display and the right-eye display include the display device module according to any one of the optional designs of the third aspect.

According to a fifth aspect, this application further provides a head-mounted display device, where the head-mounted display device is an augmented reality (AR) device or a mixed reality (MR) device, and includes a left-eye display module, a right-eye display module, a middle cover, and legs, where the middle cover is configured to fasten the left-eye display module, the right-eye display module, and the legs, and the left-eye display module or the right-eye display module includes the display device module according to any one of the optional designs of the first aspect and any one of the optional designs of the third aspect.

This embodiment of this application provides the head-mounted display device, including the display panel, the freeform prism, the first optical element, and the second optical element. The freeform prism includes the incident surface, the at least one reflective surface, and the emergent surface, and the incident surface of the freeform prism faces the display panel, so that light emitted by the display panel is capable of being transmitted through the incident surface and transmitted from the emergent surface through reflection by the at least one reflective surface. The first optical element is configured to reflect, to the second optical element, the light transmitted from the emergent surface, where an included angle is provided between the first optical element and the second optical element. The second optical element is configured to reflect, back to the first optical element, the light reflected by the first optical element, so that the light is transmitted from the first optical element. Compared with a manner in which physical glass or plastic is used for an optical structure in front of the eyes, requiring a compensation prism to be added to correct distorted imaging of an external scene, in this embodiment of this application, because an angle is provided between the first optical element and the second optical element, in other words, a gap is left between the first optical element and the second optical element, natural ambient light propagating to the human eyes is not refracted, imaging of the external scene is not distorted, and no additional compensation prism needs to be added. Therefore, a thickness of the display module in the head-mounted display device in a viewing direction of the human eyes is reduced, and a compact design of the head-mounted display device is implemented.

DESCRIPTION OF EMBODIMENTS

The following describes the embodiments of this application with reference to the accompanying drawings. It is clear that the described embodiments are merely some but not all of the embodiments of this application. A person of ordinary skill in the art may learn that the technical solutions provided in the embodiments of this application are also applicable to a similar technical problem as technology evolves and new scenarios emerge.

In this specification, claims, and accompanying drawings of this application, the terms "first", "second", and the like are intended to distinguish similar objects but do not necessarily indicate a specific order or sequence. It should be understood that the data termed in such a way interchangeable in proper circumstance so that the embodiments described herein can be implemented in other orders than the order illustrated or described herein. In addition, the terms "include", "contain" and any other variants mean to cover the non-exclusive inclusion, for example, a process, method, system, product, or device that includes a list of steps or modules is not necessarily limited to the modules, but may include other modules not expressly listed or inherent to such a process, method, product, or device. Names or numbers of steps in this application do not mean that the steps in the method procedure need to be performed in a chronological/logical order indicated by the names or numbers. An execution sequence of the steps in the procedure that have been named or numbered may be changed based on technical objectives to be implemented, provided that a same or similar technical effect can be achieved.

Figure 1:
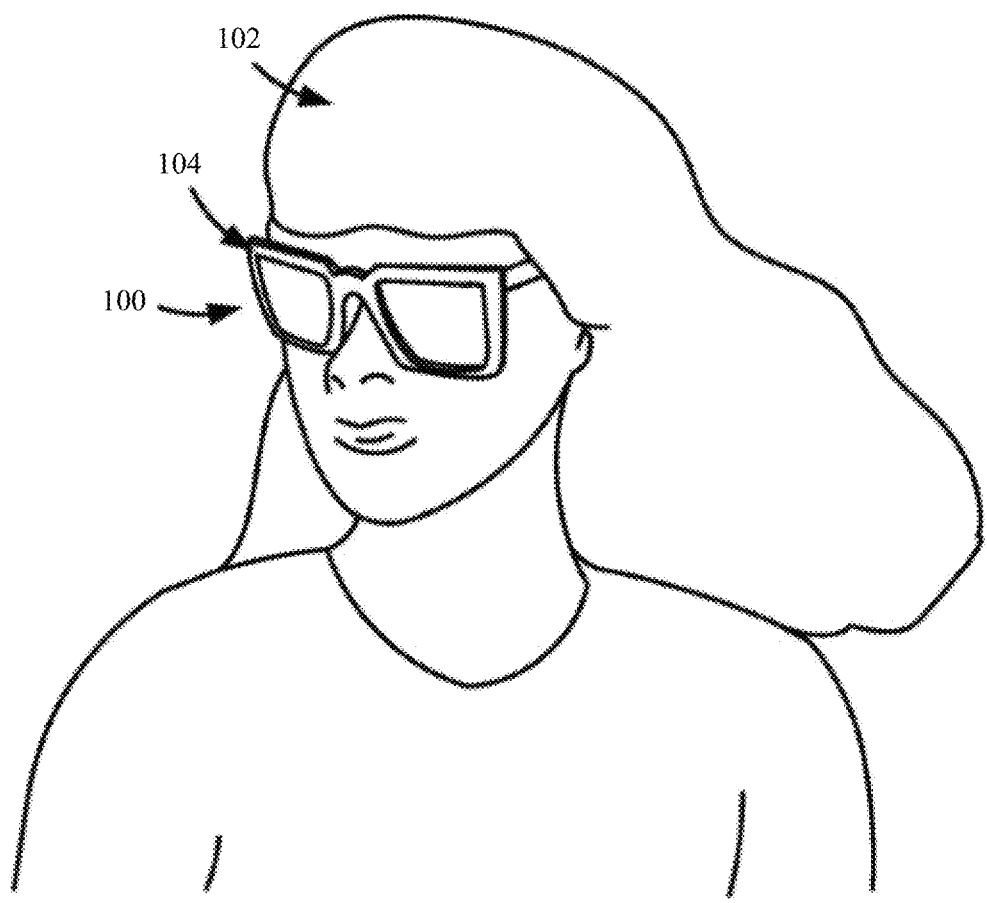
FIG. 1 is a schematic diagram of a head-mounted display device worn by a user.

FIG. 1 is a schematic diagram of a head-mounted display device 100 worn by a user 102. The head-mounted display device 100 may be configured to display an augmented reality image and a physical object in a background scene in the real world. The head-mounted display device 100 may include a frame 104 for positioning the device at a target viewing position relative to the eyes of the user 102.

Figure 2:
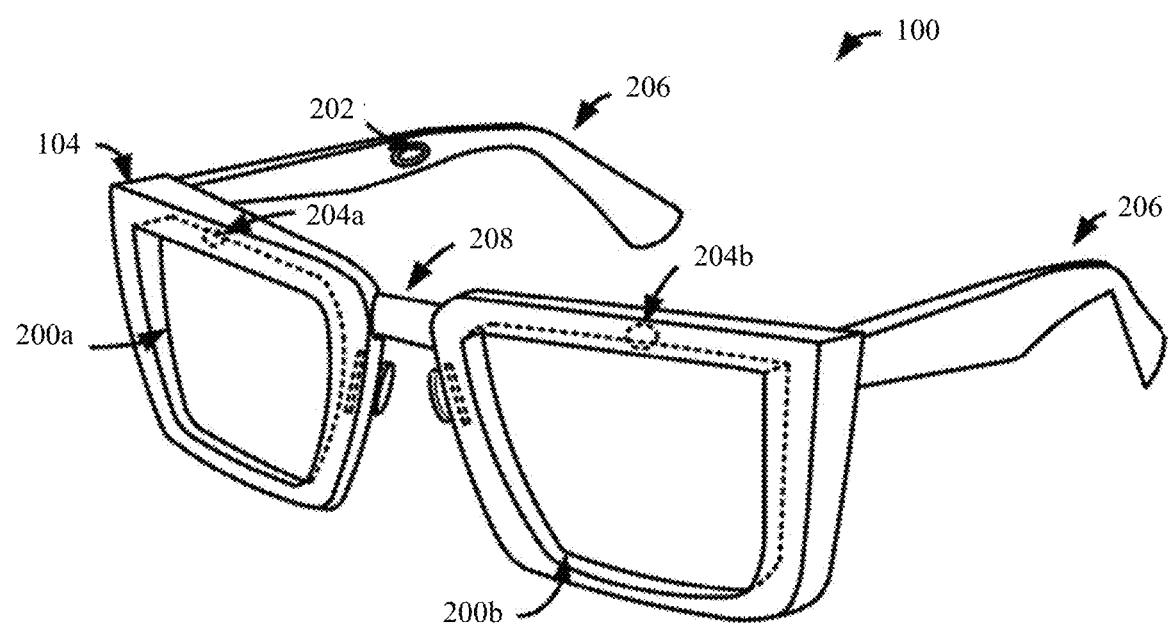
FIG. 2 is a schematic diagram of a head-mounted display device.

FIG. 2 is a schematic diagram of the head-mounted display device 100 in FIG. 1. As shown in FIG. 2, the perspective head-mounted display device 100 includes a right-eye display 200a and a left-eye display 200b. Each perspective display (the right-eye display 200a or the left-eye display 200b) may be configured to display a virtual image to a user and allow the user to view an environment in the real world. For example, each perspective display may include a display device configured to emit display light to the eyes of the user, where the light passes through an optical structure, and the display device may further allow ambient light in the real world to reach the eyes of the user. In addition, FIG. 2 schematically shows a microphone 202 that can be configured to output acoustic information to the user. Such acoustic information may be in any suitable form, and includes but is not limited to voice output that is in any suitable language (which is, for example, selected by the user) and that is generated by a computer, a tone or other sound that is not specially used for any language, and/or any other suitable sound. In some embodiments, another type of output may be provided by the head-mounted display device 100, for example, tactile/touch output.

The left-eye display 200b and the right-eye display 200a may be positioned at a viewing position relative to the eyes by using a fastening mechanism such as one or more frames 104. For example, as shown in FIG. 2, the frame 104 may be supported by the ear of the user by using an earpiece 206 and supported by the nose of the user by using a bridge 208, to reduce sliding of the frame 104. It should be understood that the supports (for example, the earpiece 206, a nose pad, and the bridge 208) shown in FIG. 2 are essentially examples, and the perspective display of the perspective head-mounted display device may be positioned at the viewing position by using any suitable mechanism. For example, an additional support may be used, and/or one or more of the supports shown in FIG. 2 may be removed, replaced, and/or expanded, to position the perspective display at the viewing position. In addition, the perspective display may be positioned at the viewing position by using a mechanism other than a support that is physically in contact with the user. This is not limited in this application.

Figure 3A:
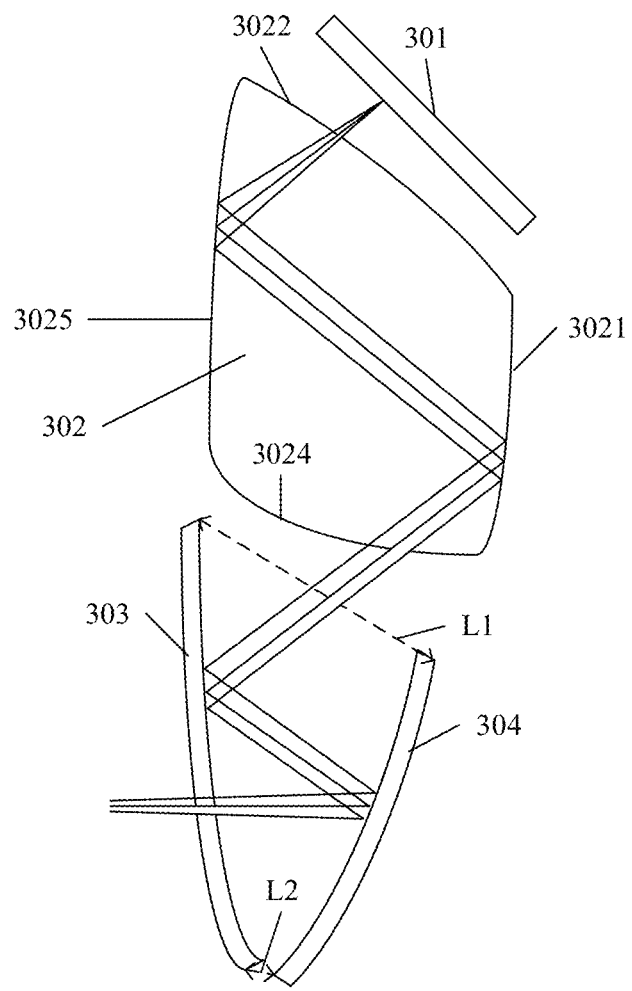
FIG. 3a is a schematic structural diagram of a display device module according to an embodiment of this application.

FIG. 3a is a schematic structural diagram of a display device module according to an embodiment of this application. Specifically, the display device module shown in FIG. 3a may be a part of the left-eye display 200b and the right-eye display 200a in FIG. 2. As shown in FIG. 3a, an example in which a non-coaxial optical component is a freeform prism is used, and the display device module provided in this application may include:

a display panel 301, a non-coaxial optical component 302, a first optical element 303, a second optical element 304, and a fastening system. It should be understood that the non-coaxial optical component in this embodiment may also be referred to as a non-coaxial optical system.

In this application, an example in which the non-coaxial optical component 302 includes a first reflective surface 3025 and a second reflective surface 3021 is used for description. This is not limited in this application. In this embodiment, that the quantity of reflective surfaces 3021 is 2 is merely used as an example for description.

The non-coaxial optical component 302 includes an incident surface 3022, the first reflective surface 3025, the second reflective surface 3021, and an emergent surface 3024.

The non-coaxial optical component 302 includes the incident surface 3022, the first reflective surface 3025, the second reflective surface 3021, and the emergent surface 3024. The incident surface 3022 of the non-coaxial optical component 302 faces the display panel 301, so that light emitted by the display panel 301 is capable of being transmitted through the incident surface 3022 and transmitted from the emergent surface 3024 through reflection between the first reflective surface 3025 and the second reflective surface 3021.

In this embodiment of this application, the display panel 301 may include any suitable component configured to generate an image for display, and the component includes but is not limited to a microdisplay and one or more light sources.

Optionally, in some embodiments, the display panel 301 may include a reflective microdisplay such as a liquid crystal on silicon (LCOS) display. In other embodiments, the display panel 301 may include a an self-luminous microdisplay such as an organic light-emitting diode (OLED) array display type, an inorganic light-emitting diode (ILED) array display type, and/or any other suitable microdisplay. The display panel 301 may include one or more light sources such as an RGB LED array, one or more white LEDs (which have, for example, a color filter apparatus), and/or any suitable light source structure for illumination.

In this embodiment of this application, the display panel 301 may display an image, and therefore may be used as a light source to emit light.

Figure 3B:
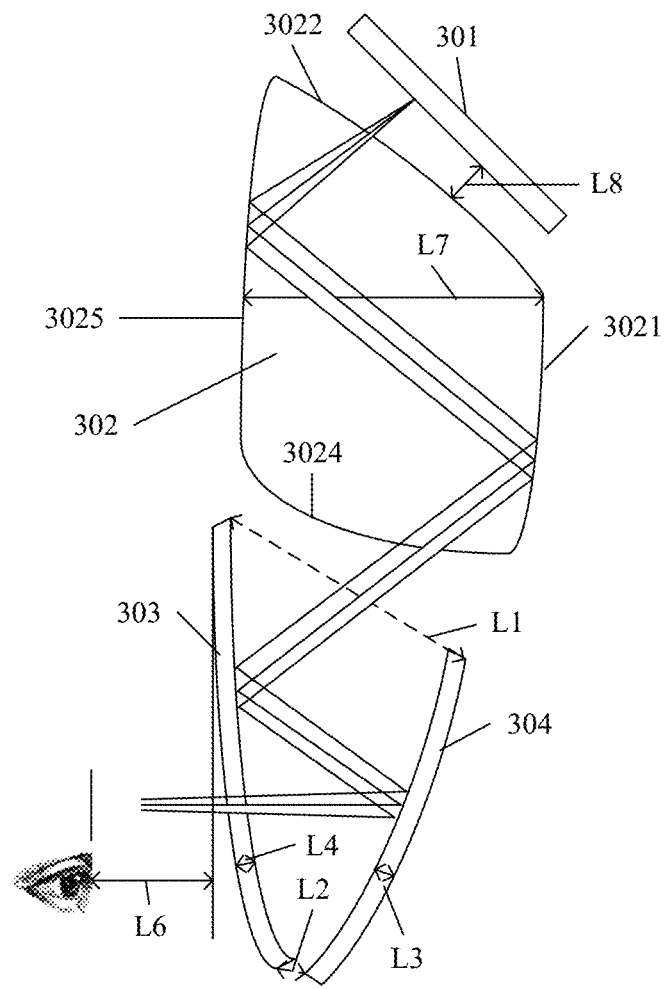
FIG. 3b is a schematic structural diagram of a display device module according to an embodiment of this application.

Optionally, in this embodiment of this application, as shown in FIG. 3b, a distance L8 between the display panel 301 and the incident surface 3022 of the non-coaxial optical component 302 may be within a range of 0.1 mm to 1 mm.

In this embodiment of this application, the non-coaxial optical component 302 may include at least three surfaces, and each surface may be but is not limited to a non-planar and non-spherical surface. For example, the non-coaxial optical component 302 may include the first reflective surface 3025, the second reflective surface 3021, the incident surface 3022, and the emergent surface 3024. The emergent surface 3024 is a lower end face of the non-coaxial optical component 302, the emergent surface 3024 may be a non-rotational symmetric transmittance surface, and an edge of the emergent surface 3024 is bent from air towards the non-coaxial optical component. In this way, an angle of incidence of main light can be reduced, thereby facilitating aberration correction. The incident surface 3022 is an upper end face of the non-coaxial optical component 302, the incident surface 3022 may be a non-rotational symmetric transmittance surface, and an edge of the incident surface 3022 may be bent towards the non-coaxial optical component 302 in a horizontal direction, to provide focal power for imaging in the horizontal direction.

It should be noted that the horizontal direction is a horizontal direction existing when a user wears a head-mounted display device.

In this embodiment of this application, the second reflective surface 3021 may be an end face of the non-coaxial optical component 302. When the user wears the head-mounted display device, the second reflective surface 3021 faces away from the human eye, and is an outer surface of the non-coaxial optical component 302. The second reflective surface 3021 may be a non-rotational symmetric reflective surface. In this embodiment of this application, light from the display panel 301 travels along a display optical path, enters the non-coaxial optical component after the light is transmitted through the incident surface 3022, is reflected between the first reflective surface 3025 and the second reflective surface 3021, and is finally transmitted from the emergent surface 3024 through reflection by the second reflective surface 3021.

It should be noted that, in this embodiment of this application, the first reflective surface 3025 and the second reflective surface 3021 of the non-coaxial optical component 302 each may be coated with a reflective film. In this case, the first reflective surface 3025 and the second reflective surface 3021 of the non-coaxial optical component 302 may reflect all incident light.

It should be noted that, in this embodiment of this application, the non-coaxial optical component may include a plurality of reflective surfaces. After the light emitted by the display panel 301 is transmitted through the incident surface 3022 of the non-coaxial optical component 302, the light enters the non-coaxial optical component 302, and is transmitted out of the non-coaxial optical component 302 from the emergent surface 3024 through folding by the plurality of reflective surfaces. A quantity of reflective surfaces is not limited in this application. In this embodiment of this application, optionally, an edge of the second reflective surface 3021 may be bent towards the non-coaxial optical component 302 in a plumb direction, to provide positive focal power for secondary imaging in the plumb direction.

It should be noted that the plumb direction is a plumb direction existing when the user wears the head-mounted display device.

Optionally, in this embodiment of this application, as shown in FIG. 3b, a width L7 of the non-coaxial optical component 302 in a horizontal viewing direction of the human eyes may be within a range of 3 mm to 15 mm.

In this embodiment of this application, when the user correctly wears the head-mounted display device, the light from the display panel 301 may travel along the display optical path, and sequentially pass through the non-coaxial optical component 302, the first optical element 303, the second optical element 304, and the first optical element 303, to reach the human eyes.

Specifically, the first optical element 303 may be configured to reflect the light to the second optical element 304. The second optical element 304 is configured to reflect, to the first optical element 303, the light reflected by the first optical element 303. The first optical element 303 is configured to transmit the light reflected by the second optical element 304.

In this embodiment of this application, the first optical element 303 may include a first surface and a second surface, the first surface is a surface facing the second optical element 304, and the second surface is a surface facing away from the second optical element 304. The second optical element 304 may include a third surface and a fourth surface, the third surface is a surface facing the first optical element 303, and the fourth surface is a surface facing away from the first optical element 303.

The first surface of the first optical element 303 may be configured to reflect light to the third surface of the second optical element 304. The third surface of the second optical element 304 is configured to reflect, to the first surface of the first optical element 303, the light reflected by the first optical element 303. The first surface of the first optical element 303 is further configured to transmit the light reflected by the second optical element 304, so that the light is transmitted from the second surface of the first optical element 303.

In this embodiment of this application, when the user wears the head-mounted display device, the second optical element 304 may be further configured to transmit natural ambient light, so that the natural light is emitted to the human eyes.

Specifically, the fourth surface of the second optical element 304 may be configured to transmit the natural ambient light.

In this embodiment of this application, an angle may be provided between the first optical element 303 and the second optical element 304, in other words, a gap may be left between the first optical element 303 and the second optical element 304.

Optionally, in this embodiment of this application, the first optical element 303 and the second optical element 304 may be optical structures with at least one bent side. As shown in FIG. 3e, one side of the first optical element 303 is bent towards the second optical element 304, and two opposite sides of the second optical element 304 are bent towards the first optical element 303. It should be noted that bending regions on the first optical element 303 and the second optical element 304 may be any one or more sides of the first optical element 303 and the second optical element 304. This is not limited in this application.

In this embodiment of this application, the first optical element may include a first end and a second end, the first end is an end that is of the first optical element and that is close to the non-coaxial optical component, the second end is an end that is of the first optical element and that is away from the non-coaxial optical component, and a distance between the first end and the human eyes is less than a distance between the second end and the human eyes. The second optical element includes a third end and a fourth end, the third end is an end that is of the second optical element and that is close to the non-coaxial optical component, the fourth end is an end that is of the second optical element and that is away from the non-coaxial optical component, and a distance between the third end and the human eyes is greater than a distance between the fourth end and the human eyes. In other words, there is an angle between the first optical element and the second optical element, and the angle faces the non-coaxial optical component above. In addition, a side that is of the first optical element and that is close to the non-coaxial optical component is closer to the human eyes than a side far away from the non-coaxial optical component, and a side that is of the second optical element and that is close to the non-coaxial optical component is farther away from the human eyes than a side far away from the non-coaxial optical component. Compared with a manner in which physical glass or plastic is used for an optical structure in front of the eyes, requiring a compensation prism to be added to correct distorted imaging of an external scene, in this embodiment of this application, because a gap is left between the first optical element 303 and the second optical element 304, natural ambient light propagating to the human eyes is not refracted, imaging of the external scene is not distorted, and no additional compensation prism needs to be added. Therefore, a thickness of the display device module in the head-mounted display device in a viewing direction of the human eyes is reduced, and a compact design of the head-mounted display device is implemented. Specifically, in this embodiment of this application, under a condition of a same design parameter (for example, a field of view of 40 degrees), the thickness of the display device module in the head-mounted display device provided in this application may be at least 5 mm less than a thickness of a display device module in a head-mounted display device in a conventional technology. In this embodiment, the thickness of the display device module may be understood as a longest distance that is between a side, of the display device module, close to the human eyes and a side away from the human eyes and that exists when the user wears the head-mounted display device.

In this embodiment of this application, as shown in FIG. 3a, there may be an angle between the first optical element 303 and the second optical element 304. Specifically, when the user wears the head-mounted display device, a position for disposing the first optical element 303 in space may be nearly vertical. There is an angle between the first optical element 303 and the second optical element 304. A distance L2 that is between a side of the second optical element 304 and a side of the first optical element 303 and that exists at a lower vertical position is less than a distance L1 that is between a side of the second optical element 304 and a side of the first optical element 303 and that exists at an upper vertical position.

It should be noted that a vertical direction may be a vertical direction existing when the user wears the head-mounted display device.

Optionally, as shown in FIG. 3a, in this embodiment of this application, an opening direction of the included angle that may exist between the first optical element 303 and the second optical element 304 may face the emergent surface 3024 of the non-coaxial optical component 302.

In an embodiment, the top of the first optical element and the top of the second optical element may be extended to wrap the display panel and the non-coaxial optical component. In this case, when the user wears the head-mounted display device, a distance that is between the second optical element 304 and the first optical element 303 and that exists at the lower vertical position may be greater than a distance that is between the second optical element 304 and the first optical element 303 and that exists at the upper vertical position. In this embodiment, the first optical element 303 may include a first region that is used to reflect, to the second optical element 304, light reflected by the reflective surface of the non-coaxial optical component 302, and a second region that may transmit light reflected by the second optical element 304. Correspondingly, the second optical element 304 may include a third region that is used to reflect, to the first optical element 303, the light reflected by the first optical element 303. In this case, when the user wears the head-mounted display device, a distance L2 that is between the third region of the second optical element 304 and the second region and that exists at the lower vertical position is less than a distance L1 that is between the third region and the first region and that exists at the upper vertical position.

In an embodiment, as shown in FIG. 3a, the non-coaxial optical component 302 is located in the opening direction of the angle formed between the first optical element 303 and the second optical element 304, and the non-coaxial optical component 302 may be located on a same side of the first optical element 303 as the second optical element 304. It should be noted that the emergent surface of the non-coaxial optical component is located on a same side of the first optical element as the second optical element.

It should be noted that, in this embodiment, the first optical element and the second optical element may be non-flat sheet-like optical structures, and surface equations of the first optical element 303 and the second optical element 304 may be represented by using the following equation that constitutes no limitation:

$$z = \frac{cr^2}{1 + \sqrt{1 - (1+k)c^2r^2}} + \sum_{i=1}^{N} A_i E_i(x, y),$$

where c is a surface radius, k is a surface conic coefficient, $A_i$ is a polynomial coefficient of an $i^{th}$ term, N may be a positive integer, $E_i$ is an additional polynomial of the $i^{th}$ term, a specific form may be: $E_1=x$, $E_2=y$, $E_3=x^2$, $E_4=xy$, $E_5=y^2$, $E_6=x^3$, $E_7=x^2y$, $E_8=xy^2$, $E_9=y^3$, ..., where x and y are surface local coordinates, and $r=x^2+y^2$.

It should be noted that the foregoing surface equation is merely an example. This is not limited in this application.

Optionally, in this embodiment of this application, as shown in FIG. 3b, a thickness L4 of the first optical element 303 may be within a range of 0.1 mm to 3 mm, and a thickness L3 of the second optical element 304 may be within a range of 0.1 mm to 3 mm.

Optionally, in this embodiment of this application, as shown in FIG. 3b, when the user wears the head-mounted display device, a distance L6 between the human eyes and a lens of the head-mounted display device may be within a range of 8 mm to 30 mm. It should be noted that a thickness of the lens of the head-mounted display device in this application may change correspondingly with different design parameters of the module. For example, the thickness of the lens of the head-mounted display device may change at least between 3 mm and 15 mm with different field of view parameters. Optionally, in this embodiment of this application, each element included in the display device module may be fastened at a corresponding position by disposing a fastening element.

In this embodiment, the display device module further includes the fastening system. The fastening system may include a housing, a bearing surface, a connecting piece, a V-shaped groove, and another mechanical structure, or may include a material used for fastening or connection.

In this embodiment, each element included in the display device module may be fastened at a corresponding position by disposing the fastening system. For example, in this embodiment of this application, a side that is of the display panel 301 and that faces away from a light emitting surface may be a bearing surface, and the display panel 301 may be fastened to a housing of the head-mounted display device by using the bearing surface.

Optionally, in this embodiment of this application, the non-coaxial optical component 302 may be fastened to the display panel through a mechanical connection.

Optionally, in this embodiment of this application, the first optical element 303 may be connected to the non-coaxial optical component 302 through positioning by using a V-shaped groove, or the first optical element 303 may be fastened to the non-coaxial optical component 302 by using a bearing surface that is extended outside a clear aperture region.

Optionally, in this embodiment of this application, the second optical element 304 may be connected to the non-coaxial optical component 302 through positioning by using a V-shaped groove, or the second optical element 304 may be fastened to the non-coaxial optical component 302 by using a bearing surface that is extended outside a clear aperture region.

It should be noted that the foregoing manner of fastening the optical element is merely an example, and does not constitute a limitation on this application.

Figure 3C:
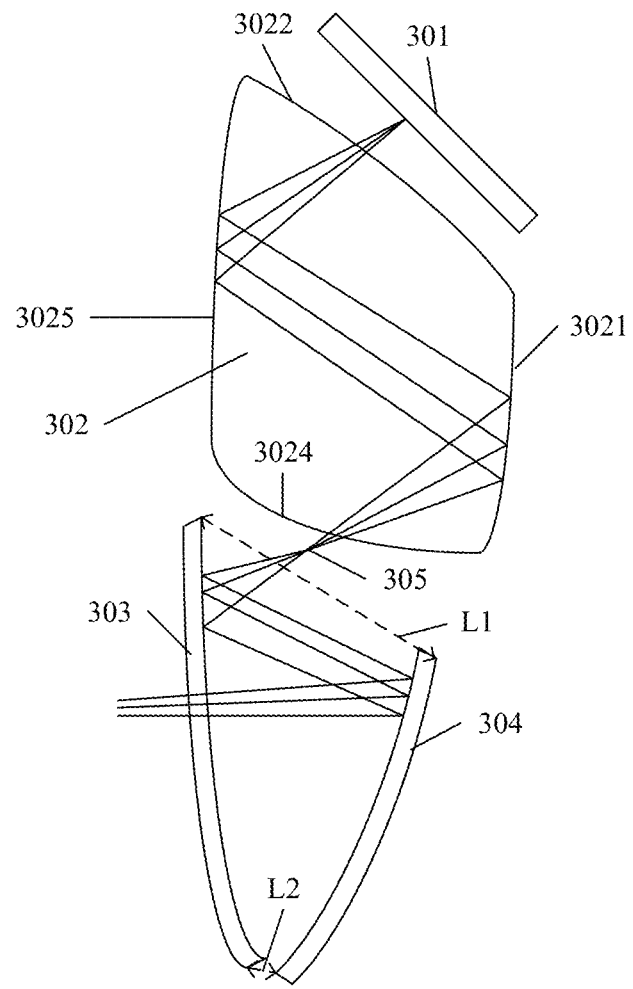
FIG. 3c is a schematic structural diagram of a display device module according to an embodiment of this application.
Figure 3D:
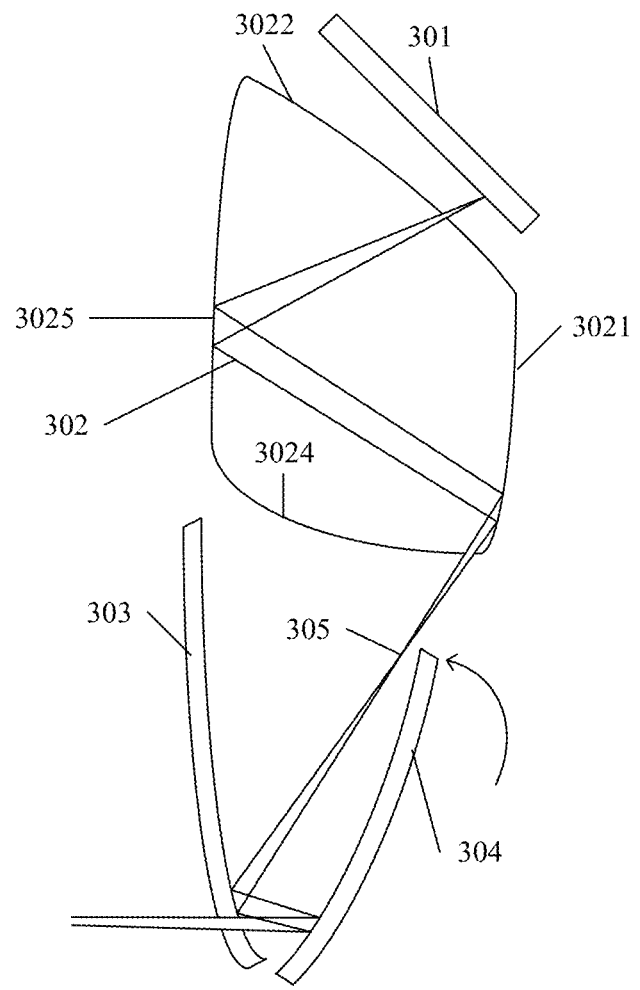
FIG. 3d is a schematic structural diagram of a display device module according to an embodiment of this application.
Figure 3E:
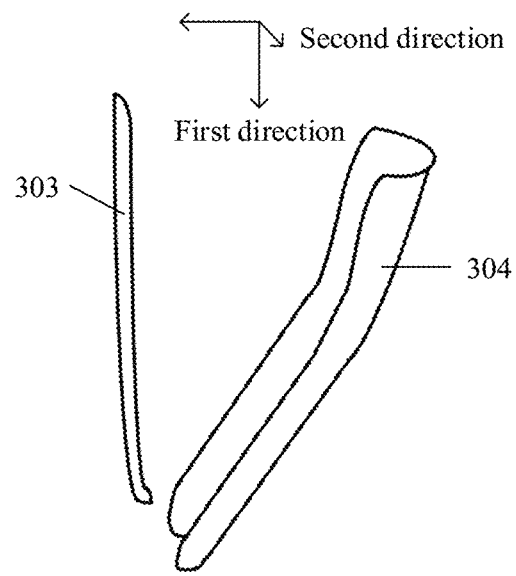
FIG. 3e is a schematic structural diagram of a display device module according to an embodiment of this application.
Figure 3F:
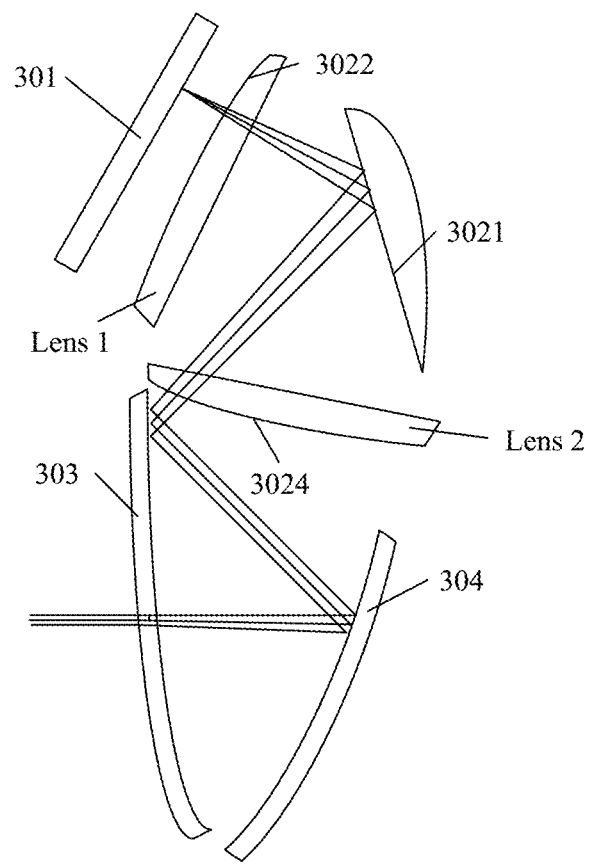
FIG. 3f is a schematic structural diagram of a display device module according to an embodiment of this application.

As shown in FIG. 3f, the non-coaxial optical component may alternatively include two lenses (a lens 1 and a lens 2) and a reflective surface. The lens 1 includes the incident surface 3022, and the lens 2 includes the emergent surface 3024.

It should be noted that the foregoing non-coaxial optical component is merely an example, and a specific structure of the non-coaxial optical component is not limited in this application.

This embodiment of this application provides the head-mounted display device, including the display panel, the non-coaxial optical component, the first optical element, and the second optical element. The non-coaxial optical component includes the incident surface and the emergent surface, and the incident surface of the non-coaxial optical component faces the display panel, so that light emitted by the display panel is capable of being transmitted through the incident surface and transmitted from the emergent surface. The first optical element is configured to reflect the light transmitted from the emergent surface, where an included angle is provided between the first optical element and the second optical element. The second optical element is configured to reflect, back to the first optical element, the light reflected by the first optical element, so that the light is transmitted from the first optical element. Compared with a manner in which physical glass or plastic is used for an optical structure in front of the eyes, requiring a compensation prism to be added to correct distorted imaging of an external scene, in this embodiment of this application, because an angle is provided between the first optical element and the second optical element, in other words, a gap is left between the first optical element and the second optical element, natural ambient light propagating to the human eyes is not refracted, imaging of the external scene is not distorted, and no additional compensation prism needs to be added. Therefore, a thickness of the display module in the head-mounted display device in a viewing direction of the human eyes is reduced, and a compact design of the head-mounted display device is implemented.

Optionally, referring to FIG. 3c, in this embodiment of this application, light that is emitted by the display panel 301 and that is in a same field of view may converge in a first direction, to form a linear image 305 on an optical path between the second reflective surface 3021 and the first optical element 303. The first direction is perpendicular to a plane formed by a horizontal viewing direction and a direction in which a line between the two eyes is located when the head-mounted display device is worn.

It should be noted that the light in the same field of view in this application may be understood as light emitted by a same light emitting point on the display panel 301.

Further, a linear image may be formed on an optical path between the emergent surface 3024 and the first optical element 303.

The first direction in this embodiment of this application may be a vertically downward (or referred to as the plumb direction) direction (references may be made to a first direction shown in FIG. 3e) existing when the user wears the head-mounted display device. Light reflected by the second reflective surface 3021 converges on a plumb surface and does not converge in the horizontal direction, to form a plurality of linear images on the optical path between the second reflective surface 3021 and the first optical element 303. Each linear image is formed through convergence of light corresponding to a same field of view.

In this embodiment of this application, geometric shapes, relative positions, and used materials of the at least one reflective surface, the incident surface, and the emergent surface (for example, the first reflective surface 3025, the second reflective surface 3021, the incident surface 3022, and the emergent surface 3024) may be changed, so that the non-coaxial optical component 302 generates different focal power in the first direction and a second direction (references may be made to a second direction shown in FIG. 3e) for incident light of the display panel 301. In this way, after passing through the non-coaxial optical component 302, light from any point on the display panel 301 intersects in the first direction, and does not intersect in the second direction at any position from the first optical element 303 to the reflective surface 3021.

It should be noted that the first direction and the second direction in this embodiment of this application are directions perpendicular to each other. The first direction is a vertically downward (or referred to as the plumb direction) direction existing when the user wears the head-mounted display device, and the second direction is a direction in which a line between two lenses is located when the user wears the head-mounted display device.

In this embodiment of this application, the first optical element 303 may be asymmetric in the plumb direction, the second optical element 304 may be asymmetric in the plumb direction, and the second optical element may be symmetric in the horizontal direction. Because the light reflected by the reflective surface 3021 converges in the first direction, a "sag" facing the second optical element exists in the lowermost light in the light reflected by the second reflective surface 3021. As shown in FIG. 3d, an upper edge of the second optical element 304 may be closer to the first optical element 303 when the light reflected by the reflective surface 3021 is not blocked, so that the gap between the first optical element 303 and the second optical element 304 is reduced. Therefore, a thickness of the display device module in the head-mounted display device in a viewing direction of the human eyes is reduced, and a compact design of the head-mounted display device is implemented.

Optionally, in this embodiment of this application, the display device module may further include a compensation prism 401. The compensation prism 401 is disposed on an optical path between the display panel 301 and the first optical element 303, and materials of the compensation prism 401 and the non-coaxial optical component 302 are different.

Figure 4A:
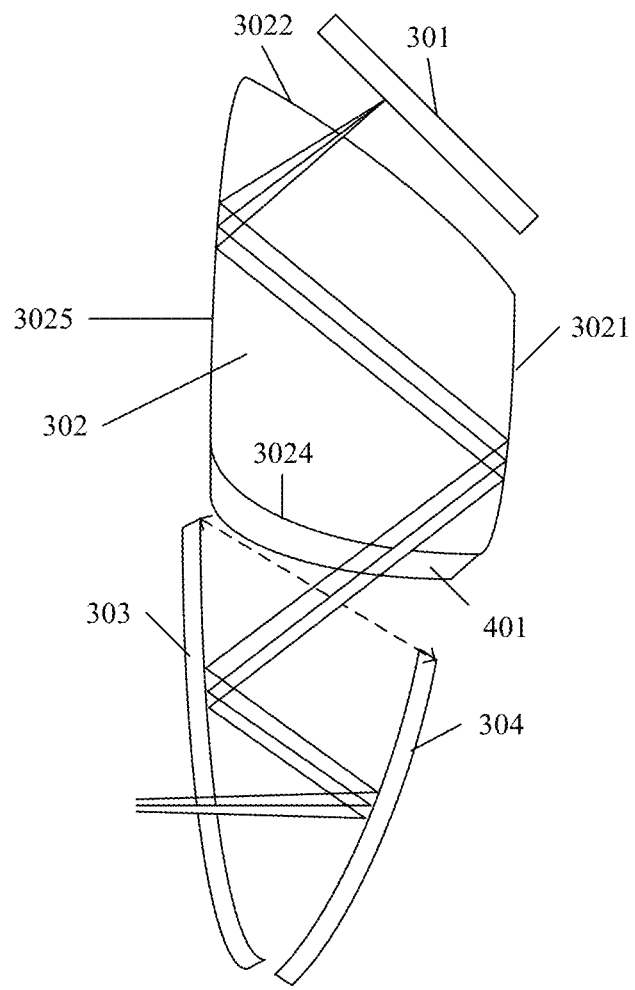
FIG. 4a is a schematic structural diagram of a display device module according to an embodiment of this application.

FIG. 4a is a schematic structural diagram of a display device module according to an embodiment of this application. As shown in FIG. 4a, the compensation prism 401 having a different material from the non-coaxial optical component 302 may be disposed on the emergent surface 3024 of the non-coaxial optical component 302 to correct chromatic aberration. A refractive index of the compensation prism 401 is different from a refractive index of the non-coaxial optical component 302. For example, a material with a low refractive index may be selected for the non-coaxial optical component 302, and correspondingly, a material with a high refractive index may be selected for the compensation prism 401. Alternatively, a material with a high refractive index may be selected for the non-coaxial optical component 302, and correspondingly, a material with a low refractive index may be selected for the compensation prism 401.

Optionally, a dispersion coefficient of the compensation prism 401 is different from a dispersion coefficient of the non-coaxial optical component 302. For example, a material with a low dispersion coefficient may be selected for the non-coaxial optical component 302, and correspondingly, a material with a high dispersion coefficient may be selected for the compensation prism 401. Alternatively, a material with a high dispersion coefficient may be selected for the non-coaxial optical component 302, and correspondingly, a material with a low dispersion coefficient may be selected for the compensation prism 401.

Figure 4B:
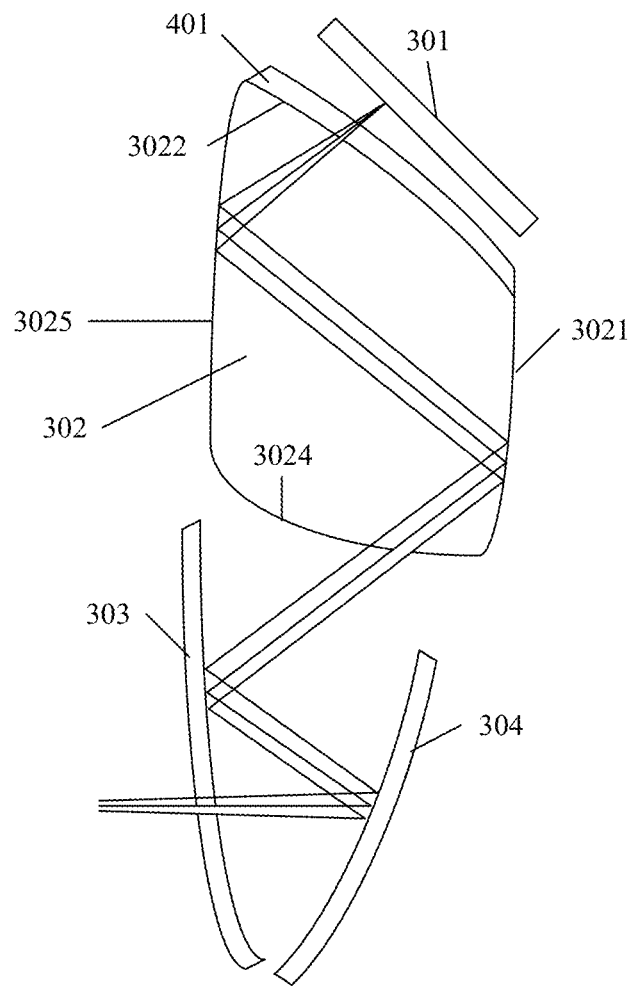
FIG. 4b is a schematic structural diagram of a display device module according to an embodiment of this application.

Optionally, in another embodiment, FIG. 4b is a schematic structural diagram of a display device module according to an embodiment of this application. As shown in FIG. 4b, the compensation prism 401 having a different material from the non-coaxial optical component 302 may be disposed on the incident surface 3022 of the non-coaxial optical component 302 to correct chromatic aberration. A refractive index of the compensation prism 401 is different from a refractive index of the non-coaxial optical component 302. For example, a material with a low refractive index may be selected for the non-coaxial optical component 302, and correspondingly, a material with a high refractive index may be selected for the compensation prism 401. Alternatively, a material with a high refractive index may be selected for the non-coaxial optical component 302, and correspondingly, a material with a low refractive index may be selected for the compensation prism 401.

Optionally, a dispersion coefficient of the compensation prism 401 is different from a dispersion coefficient of the non-coaxial optical component 302. For example, a material with a low dispersion coefficient may be selected for the non-coaxial optical component 302, and correspondingly, a material with a high dispersion coefficient may be selected for the compensation prism 401. Alternatively, a material with a high dispersion coefficient may be selected for the non-coaxial optical component 302, and correspondingly, a material with a low dispersion coefficient may be selected for the compensation prism 401.

Optionally, in this embodiment of this application, the compensation prism 401 may be attached to the light emitting surface of the display panel 301, attached to the incident surface of the non-coaxial optical component 302, attached to the reflective surface 3021 of the non-coaxial optical component 302, or attached to the emergent surface of the non-coaxial optical component 302.

Optionally, in this embodiment of this application, the compensation prism 401 may be fastened to the housing of the head-mounted display device by using a bearing surface, fastened to the display panel through a mechanical connection, or connected to the non-coaxial optical component through positioning by using a V-shaped groove.

It should be noted that the foregoing manner of fastening the compensation prism 401 is merely an example. This is not limited in this application.

Figure 5:
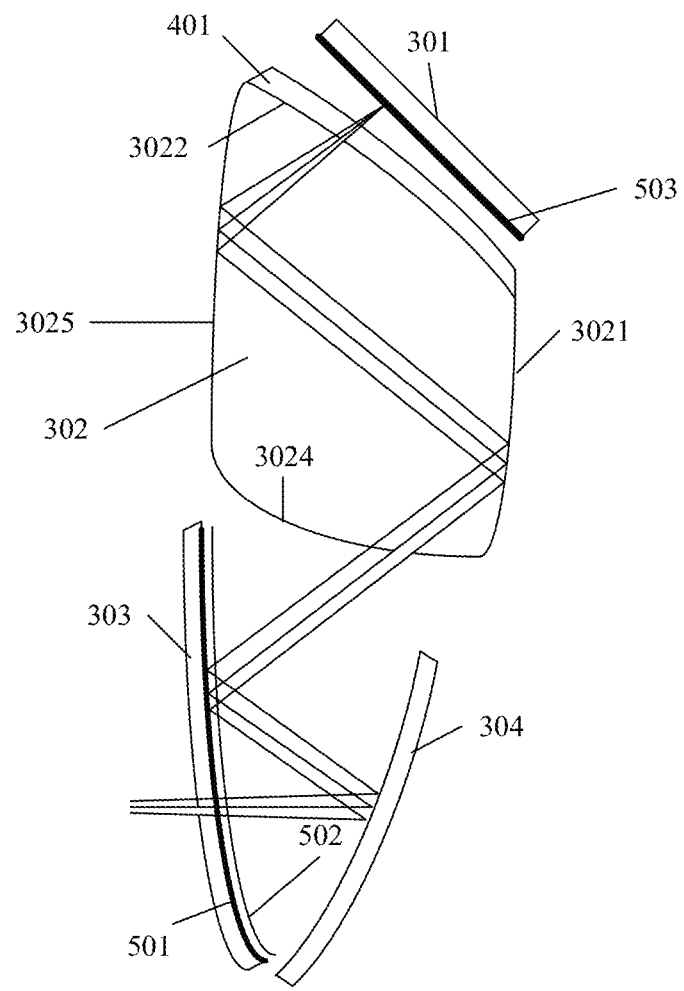
FIG. 5 is a schematic structural diagram of a display device module according to an embodiment of this application.

FIG. 5 is a schematic structural diagram of a display device module according to an embodiment of this application. As shown in FIG. 5, the display device module further includes a first polarization beam splitter 501, a first phase retarder 502, and a second phase retarder 503.

The first polarization beam splitter 501 is disposed on the surface that is of the first optical element 303 and that faces the second optical element 304, the first phase retarder 502 is disposed on a surface that is of the first polarization beam splitter 501 and that faces the second optical element 304, and the second phase retarder 503 is disposed on the optical path between the display panel 301 and the first optical element 303.

In this embodiment of this application, the first phase retarder 502 and the second phase retarder 503 may be quarter-wave plates.

Optionally, in this embodiment of this application, the second phase retarder 503 may be disposed between the display panel 301 and the incident surface 3022 of the non-coaxial optical component 302.

Optionally, in an embodiment, the second phase retarder 503 (the quarter-wave plate) may be attached to the light emitting surface of the display panel 301. In this embodiment, light emitted by the display panel 301 passes through the second phase retarder 503 (the quarter-wave plate), and becomes a type of circularly polarized light, for example, left-handed circularly polarized light. The first polarization beam splitter 501 is disposed on the surface that is of the first optical element 303 and that faces the second optical element 304, and the first phase retarder 502 is disposed on the surface that is of the first polarization beam splitter 501 and that faces the second optical element 304. The first polarization beam splitter 501 may reflect light in a polarization state and transmit light in another polarization state, for example, reflect S polarized light and transmit P polarized light (or reflect P polarized light and transmit S polarized light). An example in which the first polarization beam splitter 501 may reflect the S polarized light and transmit the P polarized light is used for description in this application.

When light passes through the first phase retarder 502 (the quarter-wave plate) for the first time, the light becomes a type of linearly polarized light, for example, S polarized light. When the light reaches the first polarization beam splitter 501, the light is reflected, then passes through the first phase retarder 502 (the quarter-wave plate) again, and becomes circularly polarized light, for example, left-handed polarized light. When the light reaches the second optical element 304, the light is reflected by the second optical element 304, and a circularly polarization state is changed, for example, the light is changed to right-handed polarized light. The light passes through the first phase retarder 502 (the quarter-wave plate) again, and becomes linearly polarized light, for example, P polarized light. The light passes through the first polarization beam splitter 501 again. In this case, a polarization state of the light is different from a polarization state existing when the light (the light reflected by the second reflective surface 3021 of the non-coaxial optical component 302) is incident for the first time. The light is transmitted when passing through the first polarization beam splitter 501.

It is clearly that, only a combination form of the polarization beam splitter and the quarter-wave plate is described in the foregoing embodiment. Another form should also fall within the protection scope of this patent. For example, the polarization beam splitter and the quarter-wave plate are placed at another position on the optical path, or the polarization beam splitter and the quarter-wave plate are separately placed at different positions on the optical path when a prism having a different material is added in front of or behind the non-coaxial optical component. This is not limited in this application. For example, the second phase retarder may be further disposed between the display panel and the first optical element, the second phase retarder may be further disposed on the first reflective surface, the second phase retarder may be further disposed on the second reflective surface, or the second phase retarder may be further disposed on the emergent surface.

Figure 6A:
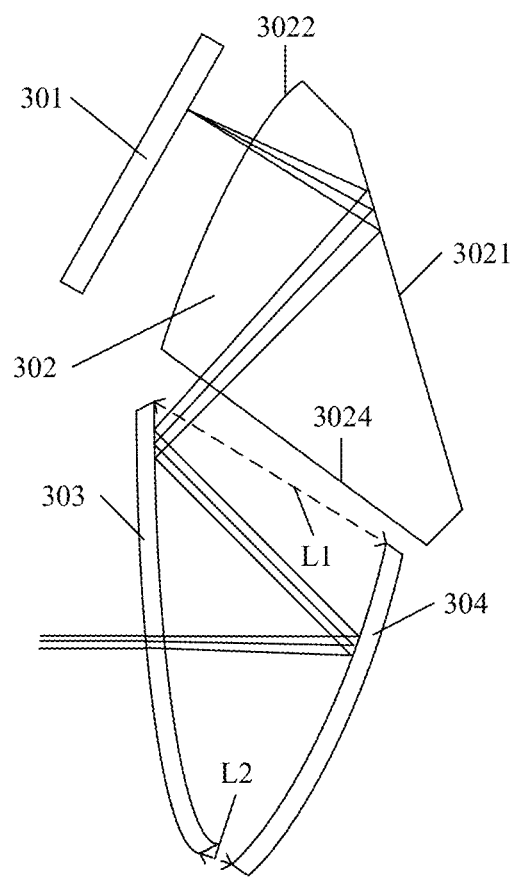
FIG. 6a is a schematic structural diagram of a display device module according to an embodiment of this application.

FIG. 6a is a schematic structural diagram of a display device module according to an embodiment of this application. Specifically, the display device module shown in FIG. 6a may be a part of the left-eye display 200b and the right-eye display 200a in FIG. 2. As shown in FIG. 6a, the display device module provided in this application may include:

a display panel 301, a freeform prism 302, a first optical element 303, and a second optical element 304.

The freeform prism 302 includes an incident surface 3022, a reflective surface 3021, and an emergent surface 3024. It should be noted that a quantity of reflective surfaces 3021 may be greater than one. This is not limited in this application. In this embodiment, that the quantity of reflective surfaces 3021 is 1 is merely used as an example for description.

The incident surface 3022 of the freeform prism 302 faces the display panel 301, so that light emitted by the display panel 301 is capable of being transmitted through the incident surface 3022 and transmitted from the emergent surface 3024 through reflection by the reflective surface 3021.

In this embodiment of this application, the display panel 301 may include any suitable component configured to generate an image for display, and the component includes but is not limited to a microdisplay and one or more light sources.

Optionally, in some embodiments, the display panel 301 may include a reflective microdisplay such as a liquid crystal on silicon (LCOS) display. In other embodiments, the display panel 301 may include an self-luminous microdisplay such as an organic light-emitting diode (OLED) array display type, an inorganic light-emitting diode (ILED) array display type, and/or any other suitable microdisplay. The display panel 301 may include one or more light sources such as an RGB LED array, one or more white LEDs (which have, for example, a color filter apparatus), and/or any suitable light source structure for illumination.

In this embodiment of this application, the display panel 301 may display an image, and therefore may be used as a light source to emit light.

Figure 6B:
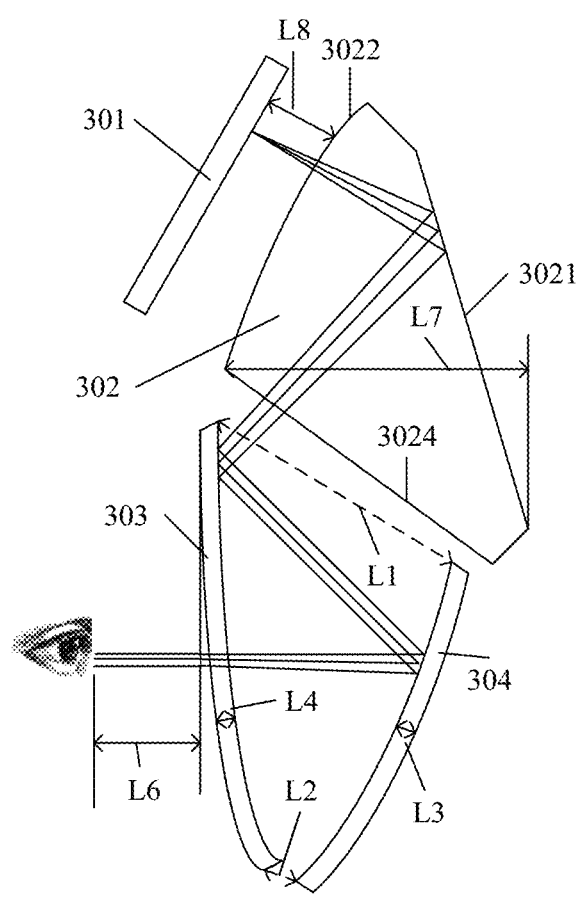
FIG. 6b is a schematic structural diagram of a display device module according to an embodiment of this application.

Optionally, in this embodiment of this application, as shown in FIG. 6b, a distance L8 between the display panel 301 and the incident surface 3022 of the freeform prism 302 may be within a range of 0.1 mm to 1 mm.

In this embodiment of this application, the freeform prism 302 may include at least three surfaces, and each surface may be but is not limited to a non-planar and non-spherical surface. For example, the freeform prism 302 may include the reflective surface 3021, the incident surface 3022, and the emergent surface 3024. The emergent surface 3024 is a lower end face of the freeform prism 302, the emergent surface 3024 may be a non-rotational symmetric transmittance surface, and an edge of the emergent surface 3024 is bent from air towards the freeform prism. In this way, an angle of incidence of a chief ray can be reduced, thereby facilitating aberration correction. The incident surface 3022 is an upper end face of the freeform prism 302, the incident surface 3022 may be a non-rotational symmetric transmittance surface, and an edge of the incident surface 3022 may be bent towards the freeform prism 302 in a horizontal direction, to provide focal power for imaging in the horizontal direction. It should be noted that the horizontal direction is a horizontal direction existing when a user wears a head-mounted display device.

In this embodiment of this application, the reflective surface 3021 is an end face of the freeform prism 302. When the user wears the head-mounted display device, the reflective surface 3021 faces away from the human eye, and is an outer surface of the freeform prism 302. The reflective surface 3021 may be non-rotational symmetric reflective surface. In this embodiment of this application, light from the display panel 301 travels along a display optical path, enters the freeform prism after the light is transmitted through the incident surface 3022, and is transmitted from the emergent surface 3024 through directional reflection by the reflective surface 3021.

It should be noted that in this embodiment of this application, the reflective surface 3021 of the freeform prism 302 may be coated with a reflective film. In this case, the reflective surface 3021 of the freeform prism 302 may reflect all light transmitted through the incident surface 3022.

It should be noted that, in this embodiment of this application, the freeform prism may include a plurality of reflective surfaces. After the light emitted by the display panel 301 is transmitted through the incident surface 3022 of the freeform prism 302, the light enters the freeform prism 302, and is transmitted out of the freeform prism 302 from the emergent surface 3024 through folding by the plurality of reflective surfaces. A quantity of reflective surfaces is not limited in this application. In this embodiment of this application, optionally, an edge of the reflective surface 3021 may be bent towards the freeform prism 302 in a plumb direction, to provide positive focal power for secondary imaging in the plumb direction. It should be noted that the plumb direction is a plumb direction existing when the user wears the head-mounted display device.

For example, the quantity of reflective surfaces is 2. FIG. 6f and FIG. 6g show a structure existing when the freeform prism includes two reflective surfaces. As shown in FIG. 6f and FIG. 6g, the freeform prism 302 includes a reflective surface 3021 and a reflective surface 3025. After light is transmitted through the incident surface 3022 of the freeform prism 302, the light enters the freeform prism 302, is reflected by the reflective surface 3025 to the reflective surface 3021, and is transmitted out of the freeform prism 302 from the emergent surface 3024 through reflection by the reflective surface 3021.

With an automatic optimization algorithm of a computer, the freeform prism may form a linear image surface by setting a proper boundary condition and merit function. A specific process is as follows:

1. Reverse design is performed by using reversibility of light, and parameters of the first optical element and the second optical element are set, so that a planar lightwave at an exit pupil position forms the linear image surface near the emergent surface 3024.

2. Reverse design is performed by using reversibility of light, and a curvature of a position that is on the emergent surface 3024 and that is close to the linear image surface is set to be similar to a curvature of the linear image surface, to correct a field curvature (similar to a function of a field lens in a camera lens).

3. Reverse design is performed by using reversibility of light, and the reflective surface 3021 is close to an intersection point of chief rays in all fields of view, to correct aberration of a system diaphragm near the system diaphragm.

4. Reverse design is performed by using reversibility of light, and the reflective surface 3025 is configured to fold the optical path.

5. Reverse design is performed by using reversibility of light, the boundary condition is set, and when an exit pupil center is used as a coordinate origin, $$\frac{K_1 Z_2 + C_1 - Y_2}{\sqrt{1 + K_1^2}} < 0,$$

where $K_1$ and $C_1$ are a slope and an intercept of upper-edge light in an upper-edge field of view before the light is reflected by the reflective surface 3021, and $Y_2$ and $Z_2$ are coordinates of an intersection between the upper-edge light in the upper-edge field of view and the emergent surface.

6. Reverse design is performed by using reversibility of light, the boundary condition is set, and when the exit pupil center is used as the coordinate origin, $$\frac{K_3 Z_4 + C_3 - Y_4}{\sqrt{1 + K_3^2}} > 0,$$

where $K_3$ and $C_3$ are a slope and an intercept of lower-edge light in a lower-edge field of view before the light is reflected by the reflective surface 3021, and $Y_4$ and $Z_4$ are coordinates of an intersection between the lower-edge light in the lower-edge field of view and the incident surface.

7. Reverse design is performed by using reversibility of light, the merit function is set, and the automatic optimization algorithm (for example, a least square algorithm) is run by using a PSF of each field of view at a display screen position as the merit function, to obtain the final freeform prism.

Optionally, in this embodiment of this application, as shown in FIG. 6b, a width L7 of the freeform prism 302 in a horizontal viewing direction of the human eyes may be within a range of 3 mm to 15 mm.

In this embodiment of this application, when the user wears the head-mounted display device, the light from the display panel 301 may travel along the display optical path, and sequentially pass through the freeform prism 302, the first optical element 303, the second optical element 304, and the first optical element 303, to reach the human eyes.

Specifically, the first optical element 303 may be configured to reflect the light to the second optical element 304. The second optical element 304 is configured to reflect, to the first optical element 303, the light reflected by the first optical element 303. The first optical element 303 is configured to transmit the light reflected by the second optical element 304.

In this embodiment of this application, the first optical element 303 may include a first surface and a second surface, the first surface is a surface facing the second optical element 304, and the second surface is a surface facing away from the second optical element 304. The second optical element 304 may include a third surface and a fourth surface, the third surface is a surface facing the first optical element 303, and the fourth surface is a surface facing away from the first optical element 303.

The first surface of the first optical element 303 may be configured to reflect light to the third surface of the second optical element 304. The third surface of the second optical element 304 is configured to reflect, to the first surface of the first optical element 303, the light reflected by the first optical element 303. The first surface of the first optical element 303 is further configured to transmit the light reflected by the second optical element 304, so that the light is transmitted from the second surface of the first optical element 303.

In this embodiment of this application, when the user wears the head-mounted display device, the second optical element 304 may be further configured to transmit natural ambient light, so that the natural light is emitted to the human eyes. Specifically, the fourth surface of the second optical element 304 may be configured to transmit the natural ambient light.

In this embodiment of this application, an angle may be provided between the first optical element 303 and the second optical element 304, in other words, a gap may be left between the first optical element 303 and the second optical element 304.

Optionally, in this embodiment of this application, the first optical element 303 and the second optical element 304 may be optical structures with at least one bent side. As shown in FIG. 6e, one side of the first optical element 303 is bent towards the second optical element 304, and two opposite sides of the second optical element 304 are bent towards the first optical element 303. It should be noted that bending regions on the first optical element 303 and the second optical element 304 may be any one or more sides of the first optical element 303 and the second optical element 304. This is not limited in this application.

Compared with a manner in which physical glass or plastic is used for an optical structure in front of the eyes, requiring a compensation prism to be added to correct distorted imaging of an external scene, in this embodiment of this application, because a gap is left between the first optical element 303 and the second optical element 304, natural ambient light propagating to the human eyes is not refracted, imaging of the external scene is not distorted, and no additional compensation prism needs to be added. Therefore, a thickness of the display module in the head-mounted display device in a viewing direction of the human eyes is reduced, and a compact design of the head-mounted display device is implemented. Specifically, in this embodiment of this application, under a condition of a same design parameter (for example, a field of view of 40 degrees), the thickness of the display device module in the head-mounted display device provided in this application may be at least 5 mm less than a thickness of a display device module in a head-mounted display device in a conventional technology. In this embodiment, the thickness of the display device module may be understood as a longest distance that is between a side, of the display device module, close to the human eyes and a side away from the human eyes and that exists when the user wears the head-mounted display device.

In this embodiment of this application, as shown in FIG. 6a, there may be an angle between the first optical element 303 and the second optical element 304. Specifically, when the user wears the head-mounted display device, a position for disposing the first optical element 303 in space may be nearly vertical. There is an angle between the first optical element 303 and the second optical element 304. A distance L2 that is between a side of the second optical element 304 and a side of the first optical element 303 and that exists at a lower vertical position is less than a distance L1 that is between a side of the second optical element 304 and a side of the first optical element 303 and that exists at an upper vertical position. It should be noted that a vertical direction may be a vertical direction existing when the user wears the head-mounted display device.

Optionally, as shown in FIG. 6a, in this embodiment of this application, an opening direction of the included angle that may exist between the first optical element 303 and the second optical element 304 may face the emergent surface 3024 of the freeform prism 302.

In an embodiment, the top of the first optical element and the top of the second optical element may be extended to wrap the display panel and the freeform prism. In this case, when the user wears the head-mounted display device, a distance that is between the second optical element 304 and the first optical element 303 and that exists at the lower vertical position may be greater than a distance that is between the second optical element 304 and the first optical element 303 and that exists at the upper vertical position. In this embodiment, the first optical element 303 may include a first region that is used to reflect, to the second optical element 304, light reflected by the reflective surface of the freeform prism 302, and a second region that may transmit light reflected by the second optical element 304. Correspondingly, the second optical element 304 may include a third region that is used to reflect, to the first optical element 303, the light reflected by the first optical element 303. In this case, when the user wears the head-mounted display device, a distance L2 that is between the third region of the second optical element 304 and the second region and that exists at the lower vertical position is less than a distance L1 that is between the third region and the first region and that exists at the upper vertical position.

In an embodiment, as shown in FIG. 6a, the freeform prism 302 is located in the opening direction of the angle formed between the first optical element 303 and the second optical element 304, and the freeform prism 302 may be located on a same side of the first optical element 303 as the second optical element 304. It should be noted that the emergent surface of the freeform prism may be alternatively located on a same side of the first optical element as the second optical element.

It should be noted that, in this embodiment, the first optical element and the second optical element may be non-flat sheet-like optical structures, and surface equations of the first optical element 303 and the second optical element 304 may be represented by using the following equation that constitutes no limitation:

$$z = \frac{cr^2}{1 + \sqrt{1-(1+k)c^2r^2}} + \sum_{i=1}^{N} A_i E_i(x, y),$$

where
c is a surface radius, k is a surface conic coefficient, $A_i$ is a polynomial coefficient of an $i^{th}$ term, N may be a positive integer, $E_i$ is an additional polynomial of the $i^{th}$ term, and a specific form may be: $E_1=x$, $E_2=y$, $E_3=x^2$, $E_4=xy$, $E_5=y^2$, $E_6=x^3$, $E_7=x^2y$, $E_8=xy^2$, $E_9=y^3$, . . . , where x and y are surface local coordinates, and $r=x^2+y^2$.

It should be noted that the foregoing surface equation is merely an example. This is not limited in this application.

Optionally, in this embodiment of this application, alternatively, the first optical element and the second optical element may be flat plates. This is not limited in this application.

Optionally, in this embodiment of this application, as shown in FIG. 6b, a thickness L4 of the first optical element 303 may be within a range of 0.1 mm to 3 mm, and a thickness L3 of the second optical element 304 may be within a range of 0.1 mm to 3 mm.

Optionally, in this embodiment of this application, as shown in FIG. 6b, when the user wears the head-mounted display device, a distance L6 between the human eyes and a lens of the head-mounted display device may be within a range of 8 mm to 30 mm. It should be noted that a thickness of the lens of the head-mounted display device in this application may change correspondingly with different design parameters of the module. For example, the thickness of the lens of the head-mounted display device may change at least between 3 mm and 15 mm with different field of view parameters.

Optionally, in this embodiment of this application, each element included in the display device module may be fastened at a corresponding position by disposing a fastening element.

For example, in this embodiment of this application, a side that is of the display panel 301 and that faces away from a light emitting surface may be a bearing surface, and the display panel 301 may be fastened to a housing of the head-mounted display device by using the bearing surface.

Optionally, in this embodiment of this application, the freeform prism 302 may be fastened to the display panel through a mechanical connection.

Optionally, in this embodiment of this application, the first optical element 303 may be connected to the freeform prism 302 through positioning by using a V-shaped groove, or the first optical element 303 may be fastened to the freeform prism 302 by using a bearing surface that is extended outside a clear aperture region.

Optionally, in this embodiment of this application, the second optical element 304 may be connected to the freeform prism 302 through positioning by using a V-shaped groove, or the second optical element 304 may be fastened to the freeform prism 302 by using a bearing surface that is extended outside a clear aperture region.

It should be noted that the foregoing manner of fastening the optical element is merely an example, and does not constitute a limitation on this application.

This embodiment of this application provides the head-mounted display device, including the display panel 301, the freeform prism 302, the first optical element 303, and the second optical element 304. The freeform prism 302 includes the incident surface 3022, the at least one reflective surface 3021, and the emergent surface 3024, and the incident surface 3022 of the freeform prism 302 faces the display panel 301, so that light emitted by the display panel 301 is transmitted through the incident surface 3022 and transmitted out of the freeform prism 302 from the emergent surface 3024 through reflection by the at least one reflective surface 3021. The first optical element 303 is configured to receive and reflect the light transmitted from the emergent surface 3024, where an included angle is provided between the first optical element 303 and the second optical element 304. The second optical element 304 is configured to reflect, back to the first optical element 303, the light reflected by the first optical element 303, so that the light is transmitted from the first optical element 303. Compared with a manner in which physical glass or plastic is used for an optical structure in front of the eyes, requiring a compensation prism to be added to correct distorted imaging of an external scene, in this embodiment of this application, because a gap is left between the first optical element 303 and the second optical element 304, natural ambient light propagating to the human eyes is not refracted, imaging of the external scene is not distorted, and no additional compensation prism needs to be added. Therefore, a thickness of the display module in the head-mounted display device in a viewing direction of the human eyes is reduced, and a compact design of the head-mounted display device is implemented.

Figure 6C:
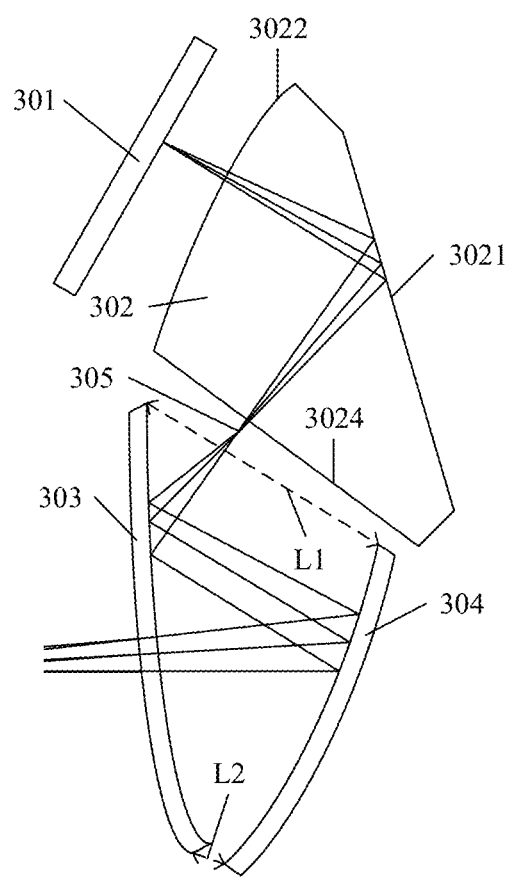
FIG. 6c is a schematic structural diagram of a display device module according to an embodiment of this application.

Optionally, referring to FIG. 6c, in this embodiment of this application, light that is emitted by the display panel 301 and that is in a same field of view may converge in a first direction, to form a linear image 305 on an optical path between the reflective surface 3021 and the first optical element 303. The first direction is perpendicular to a plane formed by a horizontal viewing direction and a direction in which a line between the two eyes is located when the head-mounted display device is worn.

It should be noted that the light in the same field of view in this application may be understood as light emitted by a same light emitting point on the display panel 301.

Further, a linear image may be formed on an optical path between the emergent surface 3024 and the first optical element 303.

The first direction in this embodiment of this application may be a vertically downward (or referred to as the plumb direction) direction (references may be made to a first direction shown in FIG. 6e) existing when the user wears the head-mounted display device. Light reflected by the reflective surface 3021 converges on a plumb surface and does not converge in the horizontal direction, to form a plurality of linear images on the optical path between the reflective surface 3021 and the first optical element 303. Each linear image is formed through convergence and intersection of light corresponding to a same field of view.

In this embodiment of this application, geometric shapes, relative positions, and used materials of the at least one reflective surface, the incident surface, and the emergent surface may be changed, so that the freeform prism 302 generates different focal power in the first direction and a second direction (references may be made to a second direction shown in FIG. 6e) for incident light of the display panel 301. In this way, after passing through the freeform prism 302, light from any point on the display panel 301 intersects in the first direction, and does not intersect in the second direction at any position from the first optical element 303 to the reflective surface 3021.

It should be noted that the first direction and the second direction in this embodiment of this application are directions perpendicular to each other. The first direction is a vertically downward (or referred to as the plumb direction) direction existing when the user wears the head-mounted display device, and the second direction is a direction in which a line between two lenses is located when the user wears the head-mounted display device.

Figure 6D:
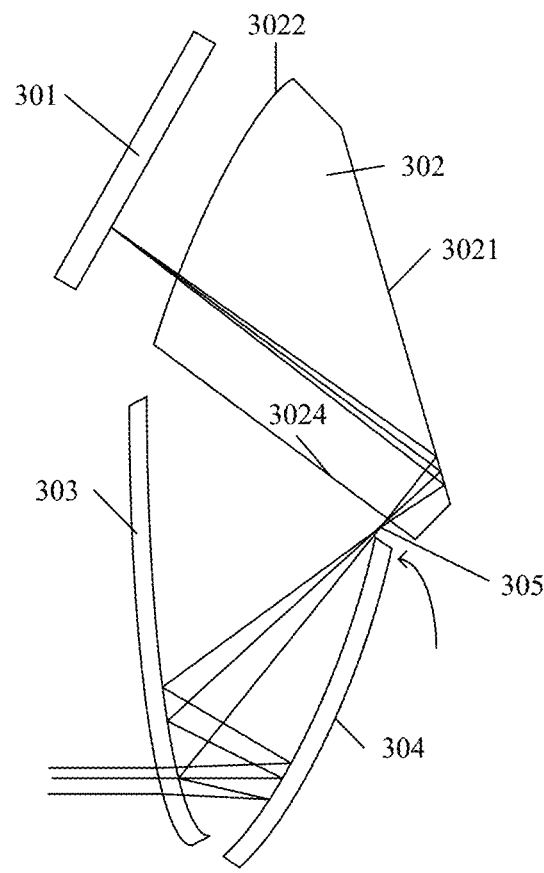
FIG. 6d is a schematic structural diagram of a display device module according to an embodiment of this application.
Figure 6E:
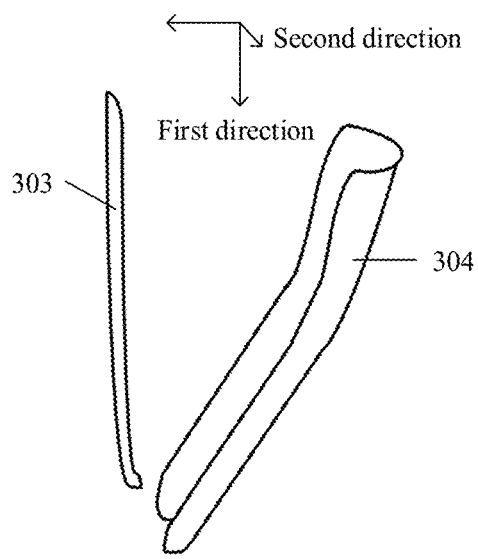
FIG. 6e is a schematic structural diagram of a display device module according to an embodiment of this application.
Figure 6F:
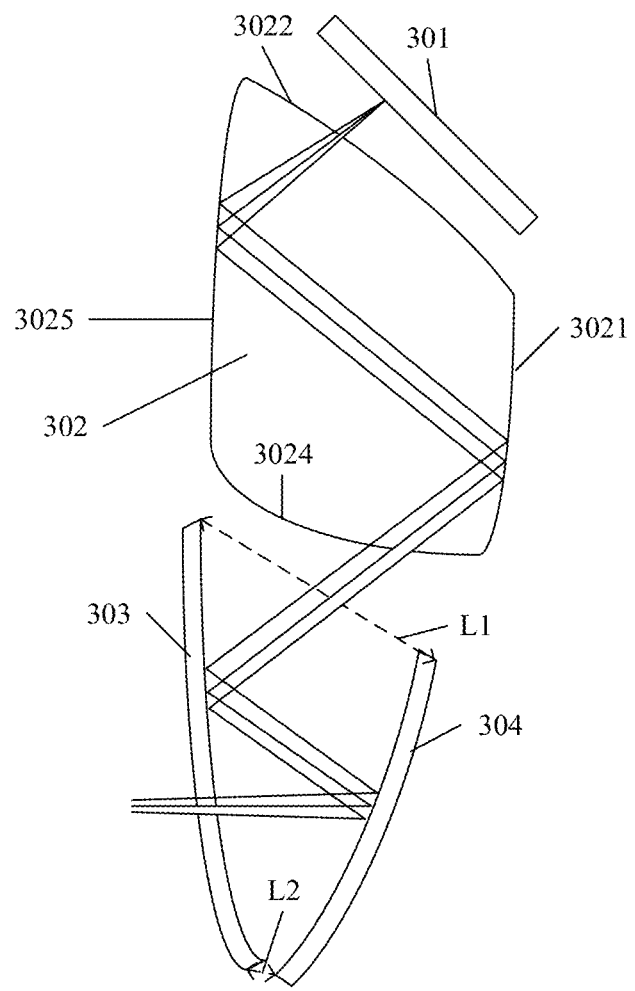
FIG. 6f is a schematic structural diagram of a display device module according to an embodiment of this application.
Figure 6G:
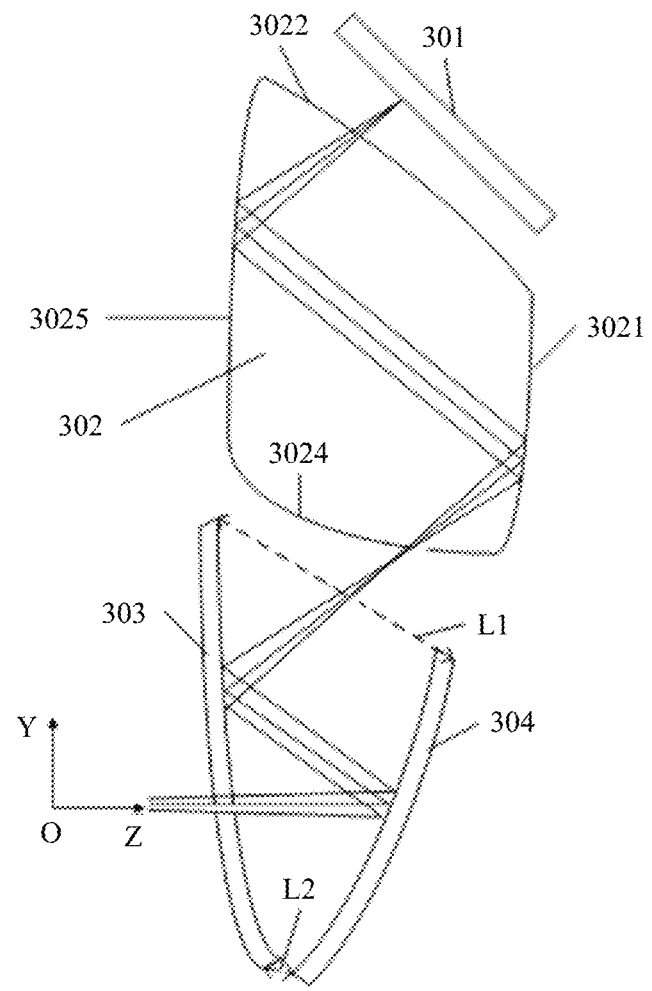
FIG. 6g is a schematic structural diagram of a display device module according to an embodiment of this application.

In this embodiment of this application, the first optical element 303 may be asymmetric in the plumb direction, the second optical element 304 may be asymmetric in the plumb direction, and the second optical element may be symmetric in the horizontal direction. Because the light reflected by the reflective surface 3021 converges in the first direction, a "sag" facing the second optical element exists in lowermost light in the light reflected by the reflective surface. As shown in FIG. 6d, an upper edge of the second optical element 304 may be closer to the first optical element 303 when the light reflected by the reflective surface 3021 is not blocked, so that the gap between the first optical element 303 and the second optical element 304 is reduced. Therefore, a thickness of the display device module in the head-mounted display device in a viewing direction of the human eyes is reduced, and a compact design of the head-mounted display device is implemented.

Optionally, in this embodiment of this application, the display device module may further include a compensation prism 401. The compensation prism 401 is disposed on an optical path between the display panel 301 and the first optical element 303, and materials of the compensation prism 401 and the freeform prism 302 are different.

Figure 7A:
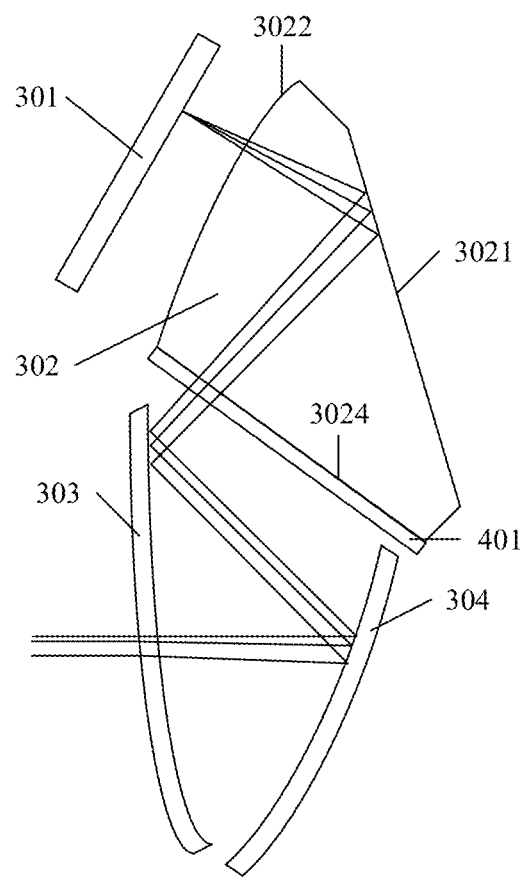
FIG. 7a is a schematic structural diagram of a display device module according to an embodiment of this application.

FIG. 7a is a schematic structural diagram of a display device module according to an embodiment of this application. As shown in FIG. 7a, the compensation prism 401 having a different material from the freeform prism 302 may be disposed on the emergent surface 3024 of the freeform prism 302 to correct chromatic aberration. A refractive index of the compensation prism 401 is different from a refractive index of the freeform prism 302. For example, a material with a low refractive index may be selected for the freeform prism 302, and correspondingly, a material with a high refractive index may be selected for the compensation prism 401. Alternatively, a material with a high refractive index may be selected for the freeform prism 302, and correspondingly, a material with a low refractive index may be selected for the compensation prism 401.

Optionally, a dispersion coefficient of the compensation prism 401 is different from a dispersion coefficient of the freeform prism 302. For example, a material with a low dispersion coefficient may be selected for the freeform prism 302, and correspondingly, a material with a high dispersion coefficient may be selected for the compensation prism 401. Alternatively, a material with a high dispersion coefficient may be selected for the freeform prism 302, and correspondingly, a material with a low dispersion coefficient may be selected for the compensation prism 401.

Figure 7B:
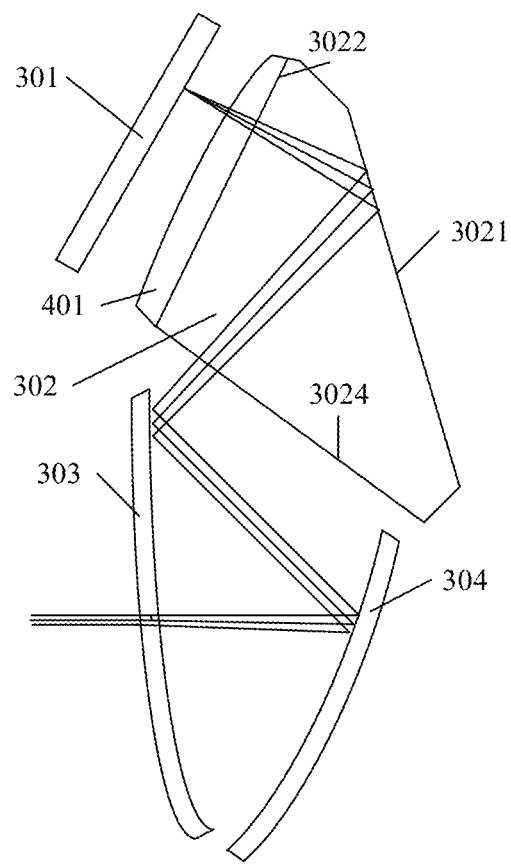
FIG. 7b is a schematic structural diagram of a display device module according to an embodiment of this application.

Optionally, in another embodiment, FIG. 7b is a schematic structural diagram of a display device module according to an embodiment of this application. As shown in FIG. 7b, the compensation prism 401 having a different material from the freeform prism 302 may be disposed on the incident surface 3022 of the freeform prism 302 to correct chromatic aberration. A refractive index of the compensation prism 401 is different from a refractive index of the freeform prism 302. For example, a material with a low refractive index may be selected for the freeform prism 302, and correspondingly, a material with a high refractive index may be selected for the compensation prism 401. Alternatively, a material with a high refractive index may be selected for the freeform prism 302, and correspondingly, a material with a low refractive index may be selected for the compensation prism 401.

Optionally, a dispersion coefficient of the compensation prism 401 is different from a dispersion coefficient of the freeform prism 302. For example, a material with a low dispersion coefficient may be selected for the freeform prism 302, and correspondingly, a material with a high dispersion coefficient may be selected for the compensation prism 401. Alternatively, a material with a high dispersion coefficient may be selected for the freeform prism 302, and correspondingly, a material with a low dispersion coefficient may be selected for the compensation prism 401.

Optionally, in this embodiment of this application, the compensation prism 401 may be attached to the light emitting surface of the display panel 301, attached to the incident surface of the freeform prism 302, attached to the reflective surface 3021 of the freeform prism 302, or attached to the emergent surface of the freeform prism 302.

Optionally, in this embodiment of this application, the compensation prism 401 may be fastened to the housing of the head-mounted display device by using a bearing surface, fastened to the display panel through a mechanical connection, or connected to the freeform prism through positioning by using a V-shaped groove.

It should be noted that the foregoing manner of fastening the compensation prism 401 is merely an example. This is not limited in this application.

It should be understood that, provided that there is no technical contradiction, for the related descriptions of the display device module provided in FIG. 6a to FIG. 7b, refer to the descriptions of the display device module in FIG. 3a to FIG. 5 and the related embodiments. For example, the display device module provided in FIG. 6a to FIG. 7b may also include the fastening system in FIG. 3a to FIG. 5 and the related embodiments.

Figure 8:
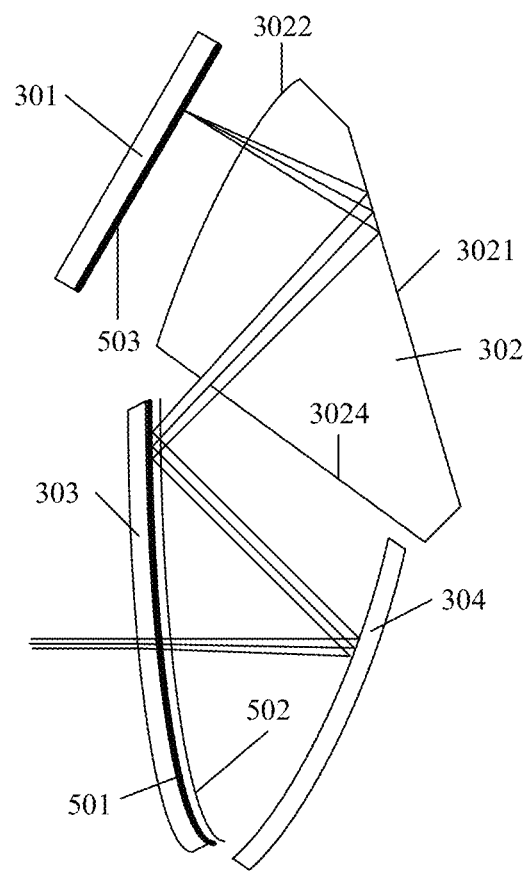
FIG. 8 is a schematic structural diagram of a display device module according to an embodiment of this application.

FIG. 8 is a schematic structural diagram of a display device module according to an embodiment of this application. As shown in FIG. 8, the display device module further includes a first polarization beam splitter 501, a first phase retarder 502, and a second phase retarder 503.

The first polarization beam splitter 501 is disposed on the surface that is of the first optical element 303 and that faces the second optical element 304, the first phase retarder 502 is disposed on a surface that is of the first polarization beam splitter 501 and that faces the second optical element 304, and the second phase retarder 503 is disposed on the optical path between the display panel 301 and the first optical element 303.

In this embodiment of this application, the first phase retarder 502 and the second phase retarder 503 may be quarter-wave plates.

Optionally, in this embodiment of this application, the second phase retarder 503 may be disposed between the display panel 301 and the incident surface 3022 of the freeform prism 302.

Optionally, in an embodiment, the second phase retarder 503 (the quarter-wave plate) may be attached to the light emitting surface of the display panel 301. In this embodiment, light emitted by the display panel 301 passes through the second phase retarder 503 (the quarter-wave plate), and becomes a type of circularly polarized light, for example, left-handed circularly polarized light. The first polarization beam splitter 501 is disposed on the surface that is of the first optical element 303 and that faces the second optical element 304, and the first phase retarder 502 is disposed on the surface that is of the first polarization beam splitter 501 and that faces the second optical element 304. The first polarization beam splitter 501 may reflect light in a polarization state and transmit light in another polarization state, for example, reflect S polarized light and transmit P polarized light (or reflect P polarized light and transmit S polarized light). An example in which the first polarization beam splitter 501 may reflect the S polarized light and transmit the P polarized light is used for description in this application.

When light passes through the first phase retarder 502 (the quarter-wave plate) for the first time, the light becomes a type of linearly polarized light, for example, S polarized light. When the light reaches the first polarization beam splitter 501, the light is reflected, then passes through the first phase retarder 502 (the quarter-wave plate) again, and becomes circularly polarized light, for example, left-handed polarized light. When the light reaches the second optical element 304, the light is reflected by the second optical element 304, and a circularly polarization state is changed, for example, the light is changed to right-handed polarized light. The light passes through the first phase retarder 502 (the quarter-wave plate) again, and becomes linearly polarized light, for example, P polarized light. The light passes through the first polarization beam splitter 501 again. In this case, a polarization state of the light is different from a polarization state existing when the light (the light reflected by the reflective surface 3021 of the freeform prism 302) is incident for the first time. The light is transmitted when passing through the first polarization beam splitter 501.

It is clearly that, only a combination form of the polarization beam splitter and the quarter-wave plate is described in the foregoing embodiment. Another form should also fall within the protection scope of this patent. For example, the polarization beam splitter and the quarter-wave plate are placed at another position on the optical path, or the polarization beam splitter and the quarter-wave plate are separately placed at different positions on the optical path when a prism having a different material is added in front of or behind the freeform prism. This is not limited in this application. For example, the second phase retarder may be further disposed between the display panel and the first optical element, the second phase retarder may be further disposed on the reflective surface, or the second phase retarder may be further disposed on the emergent surface.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application shown in FIG. 2. The foregoing storage medium includes: any medium that can store program code, such as a USB flash drive, a removable hard disk, a read-only memory (ROM), a random access memory (RAM), a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A display device module, comprising:
a display panel, a non-coaxial optical component, a first optical element, and a second optical element, wherein the non-coaxial optical component comprises an incident surface and an emergent surface, and the incident surface of the non-coaxial optical component faces the display panel, so that light emitted by the display panel is capable of being transmitted through the incident surface and transmitted from the emergent surface;
the first optical element is configured to reflect, to the second optical element, the light transmitted from the emergent surface; and
the second optical element is configured to reflect, back to the first optical element, the light reflected by the first optical element, so that the light is transmitted from the first optical element.

2. The display device module according to claim 1, wherein the non-coaxial optical component further comprises at least one reflective surface; and
the at least one reflective surface is disposed between the incident surface and the emergent surface, so that the light transmitted through the incident surface is capable of being transmitted from the emergent surface through reflection by the at least one reflective surface.

3. The display device module according to claim 1, wherein the first optical element and the second optical element are sheet-like optical structures.

4. The display device module according to claim 1, wherein the first optical element and the second optical element are plate-like optical structures or optical structures with at least one bent side.

5. The display device module according to claim 1, wherein an opening direction of the included angle formed between the first optical element and the second optical element faces the emergent surface of the non-coaxial optical component.

6. The display device module according to claim 1, wherein the non-coaxial optical component is located on a same side of the first optical element as the second optical element.

7. The display device module according to claim 1, wherein the first optical element comprises a first end and a second end, the first end is an end of the first optical element that is close to the non-coaxial optical component, the second end is an end of the first optical element that is away from the non-coaxial optical component, and a distance between the first end and the human eyes is less than a distance between the second end and the human eyes.

8. The display device module according to claim 1, wherein the second optical element comprises a third end and a fourth end, the third end is an end of the second optical element that is close to the non-coaxial optical component, the fourth end is an end of the second optical element that is away from the non-coaxial optical component, and a distance between the third end and the human eyes is greater than a distance between the fourth end and the human eyes.

9. The display device module according to claim 1, wherein the display device module further comprises a fastening system, and the fastening system is configured to fasten the display panel, the non-coaxial optical component, the first optical element, and the second optical element.

10. A head-mounted display device, comprising a left-eye display and a right-eye display, wherein
the left-eye display and the right-eye display comprise the display device module according to claim 1.

11. A display device module, comprising:

a display panel, a freeform prism, a first optical element, and a second optical element, wherein the freeform prism comprises an incident surface, at least one reflective surface, and an emergent surface, and the incident surface of the freeform prism faces the display panel, so that light emitted by the display panel is capable of being transmitted through the incident surface and transmitted from the emergent surface through reflection by the at least one reflective surface;

the first optical element is configured to reflect, to the second optical element, the light transmitted from the emergent surface; and the second optical element is configured to reflect, back to the first optical element, the light reflected by the first optical element, so that the light is transmitted from the first optical element.

12. The display device module according to claim 11, wherein the first optical element and the second optical element are sheet-like optical structures.

13. The display device module according to claim 11, wherein the first optical element and the second optical element are plate-like optical structures or optical structures with at least one bent side.

14. The display device module according to claim 11, wherein an opening direction of the included angle formed between the first optical element and the second optical element faces the emergent surface of the freeform prism.

15. The display device module according to claim 11, wherein the freeform prism is located on a same side of the first optical element as the second optical element.

16. The display device module according to claim 11, wherein the freeform prism has two reflective surfaces.

17. The display device module according to claim 11, wherein a medium between the first optical element and the second optical element is air.

18. The display device module according to claim 11, wherein the first optical element comprises a first end and a second end, the first end is an end of the first optical element that is close to the freeform prism, the second end is an end of the first optical element that is away from the freeform prism, and a distance between the first end and the human eyes is less than a distance between the second end and the human eyes.

19. The display device module according to claim 11, wherein the second optical element comprises a third end and a fourth end, the third end is an end of the second optical element that is close to the freeform prism, the fourth end is an end of the second optical element that is away from the freeform prism, and a distance between the third end and the human eyes is greater than a distance between the fourth end and the human eyes.

20. The display device module according to claim 11, wherein the display device module further comprises a fastening system, and the fastening system is configured to fasten the display panel, the freeform prism, the first optical element, and the second optical element.

* * * * *